Figure 1:
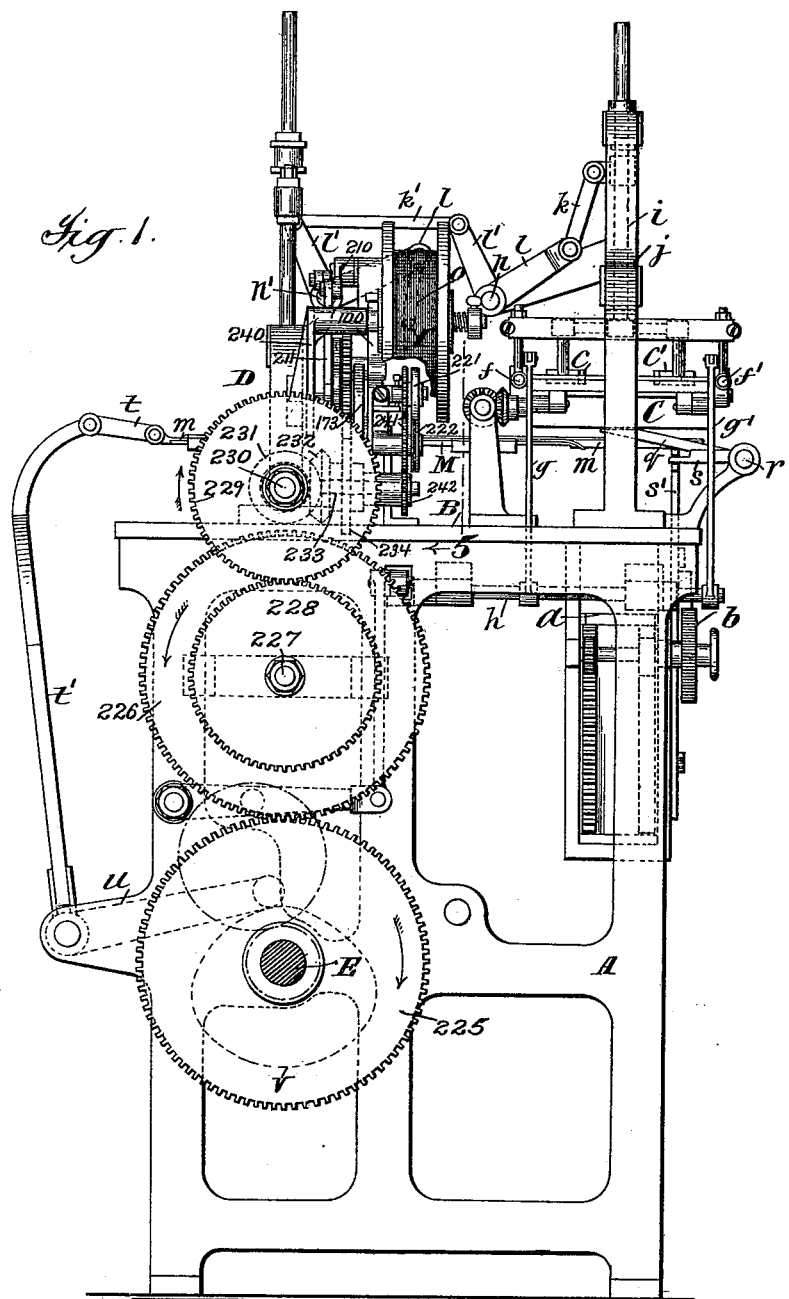

No. 635,356. Patented Oct. 24, 1899.
E. P. SHELDON.
MACHINE FOR WIRING BLANKS.
(Application filed Feb. 18, 1898.)

(No Model.) 16 Sheets—Sheet 1.

Attest:
O. F. Kehoe
G. M. Borst

Inventor:
Edward P. Sheldon
by Philipp Phelps
Sawyer
Attys

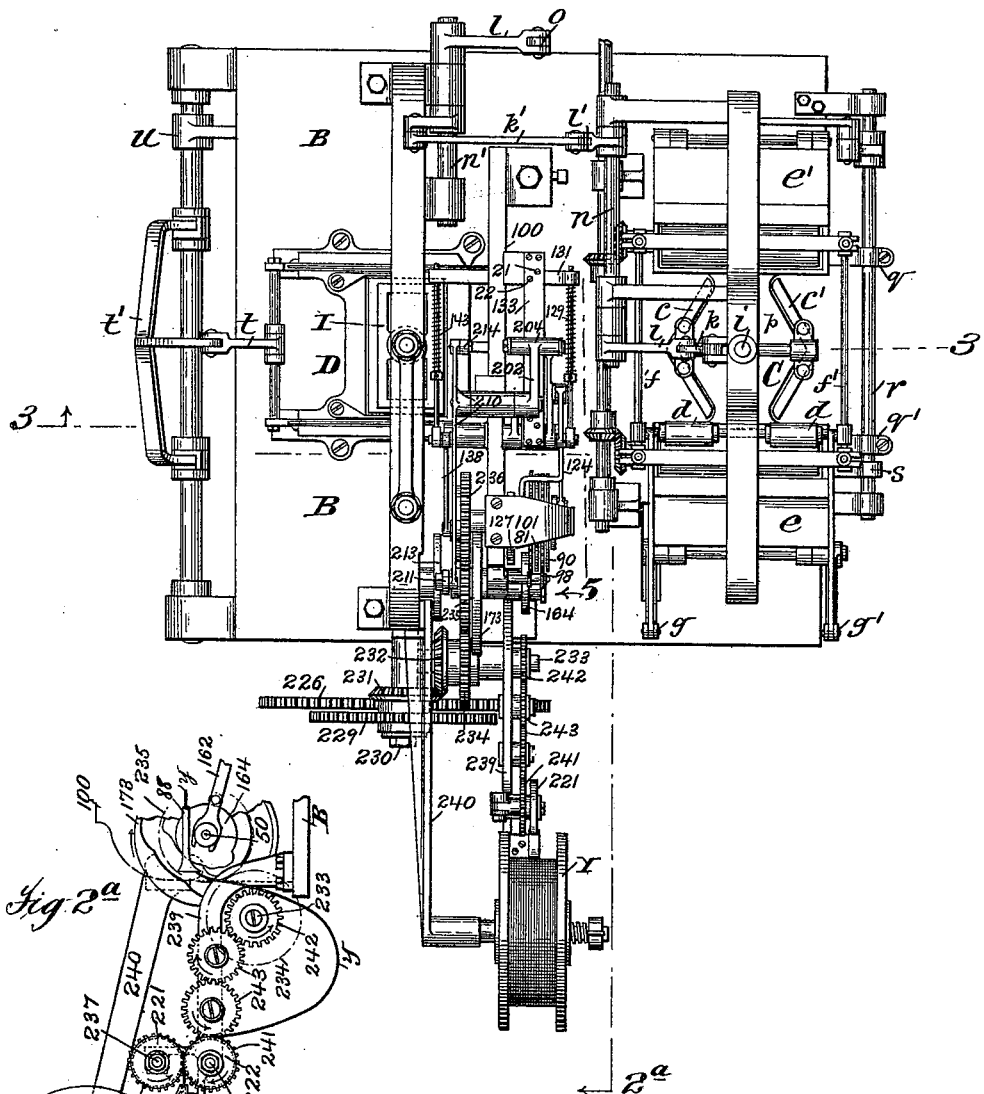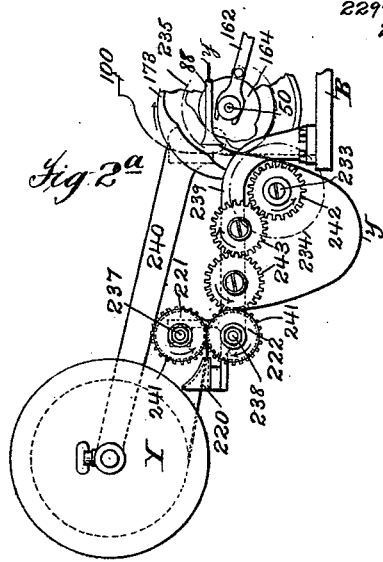

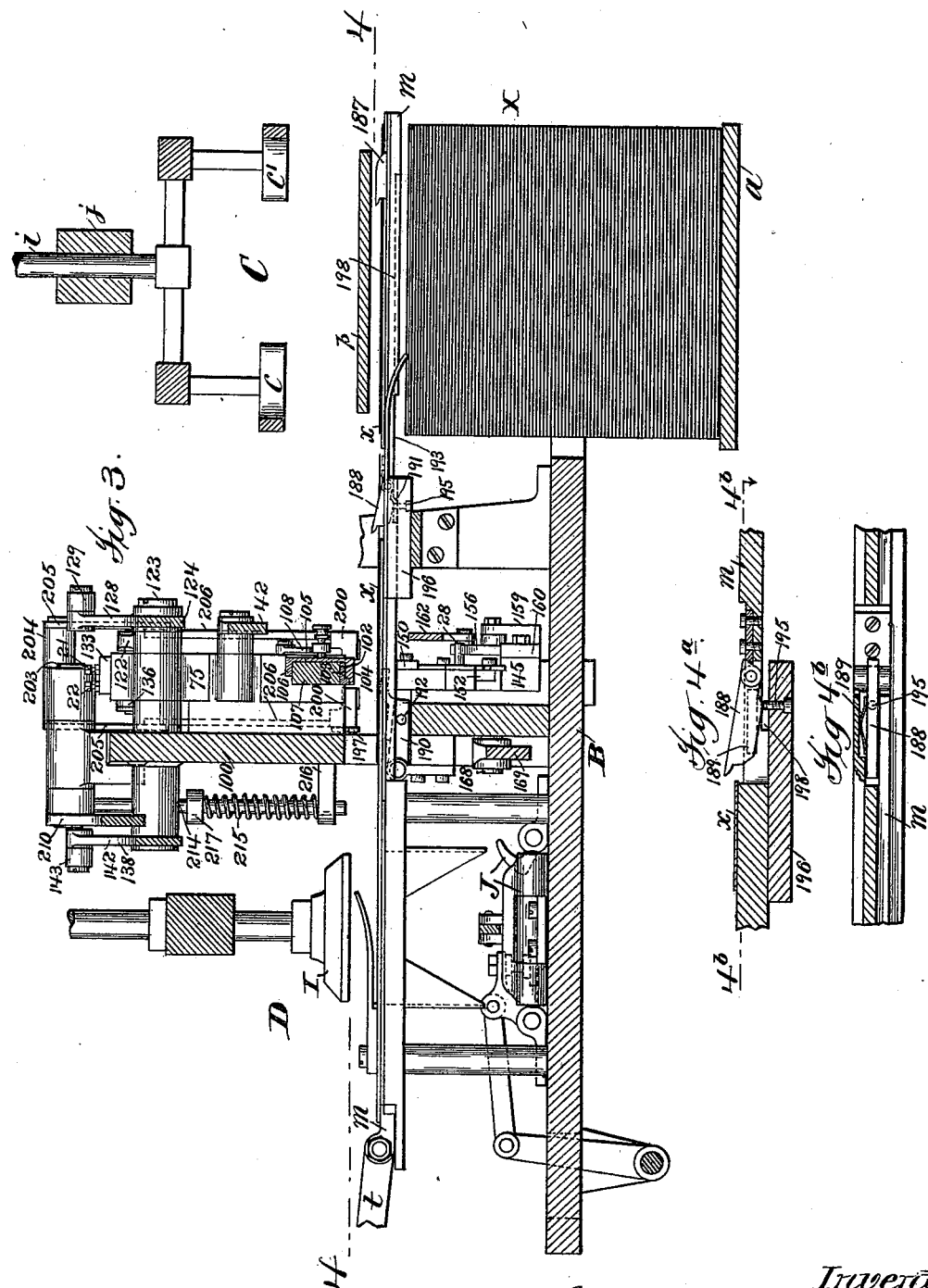

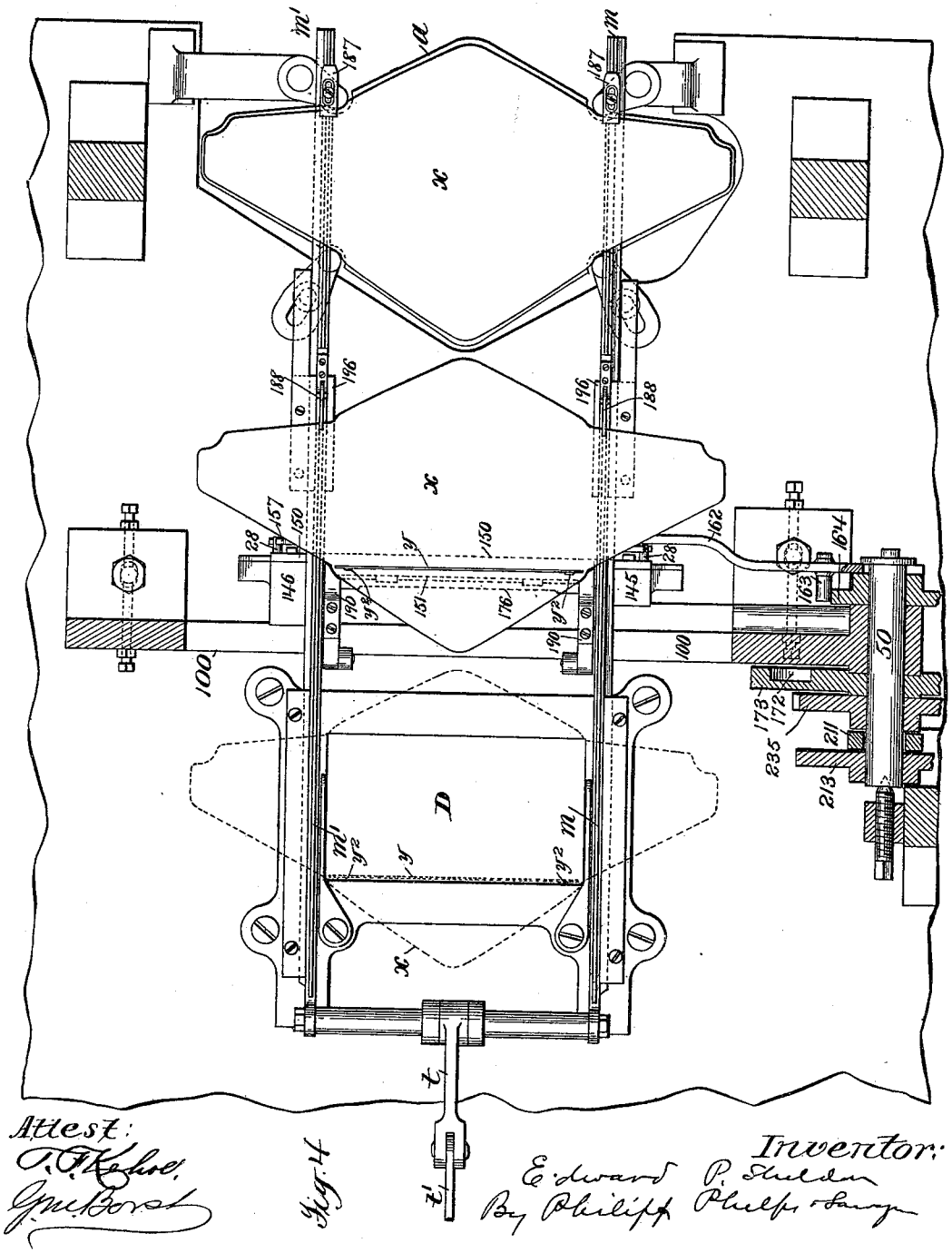

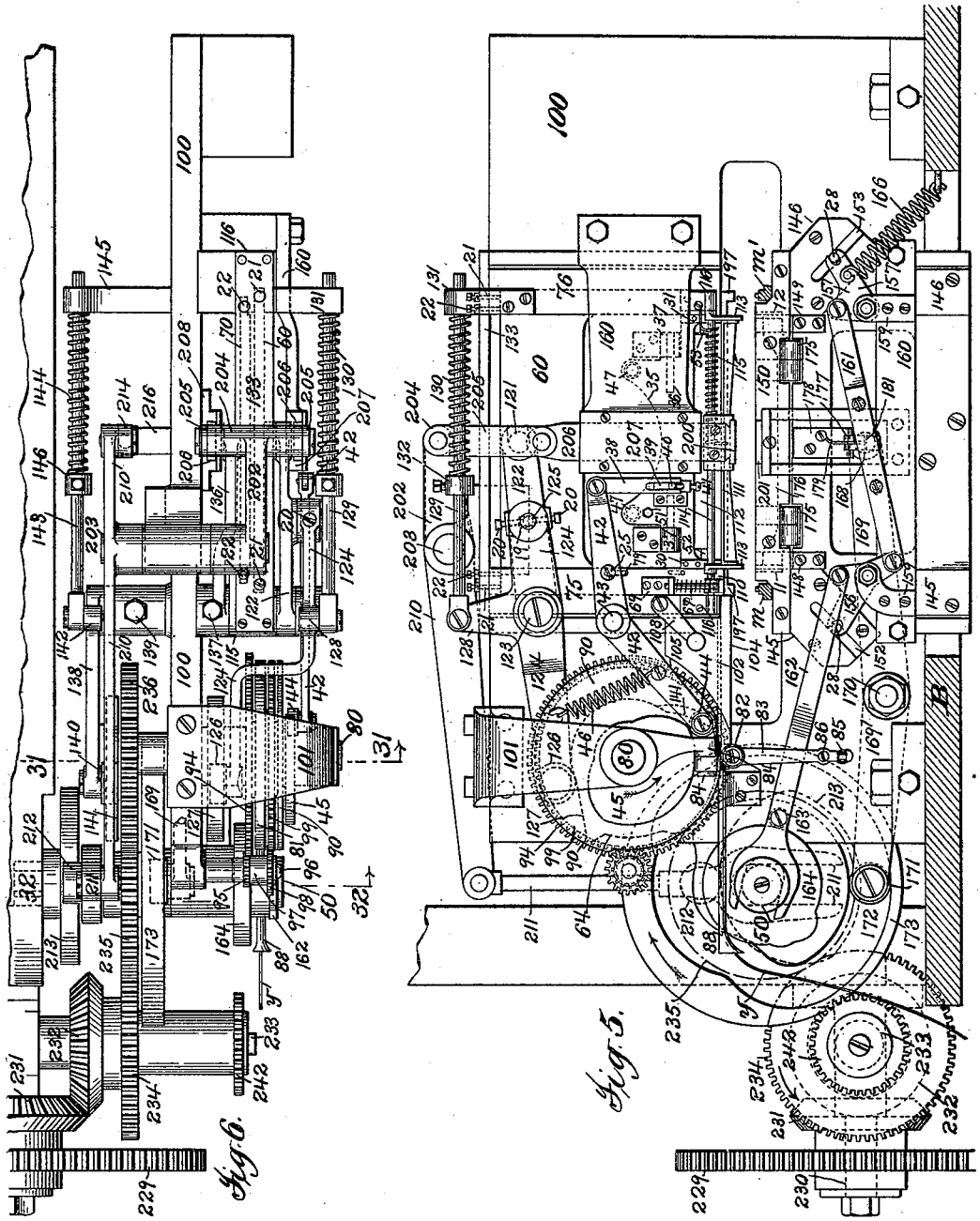

No. 635,356. Patented Oct. 24, 1899.
E. P. SHELDON.
MACHINE FOR WIRING BLANKS.
(Application filed Feb. 18, 1898.)
(No Model.) 16 Sheets—Sheet 6.
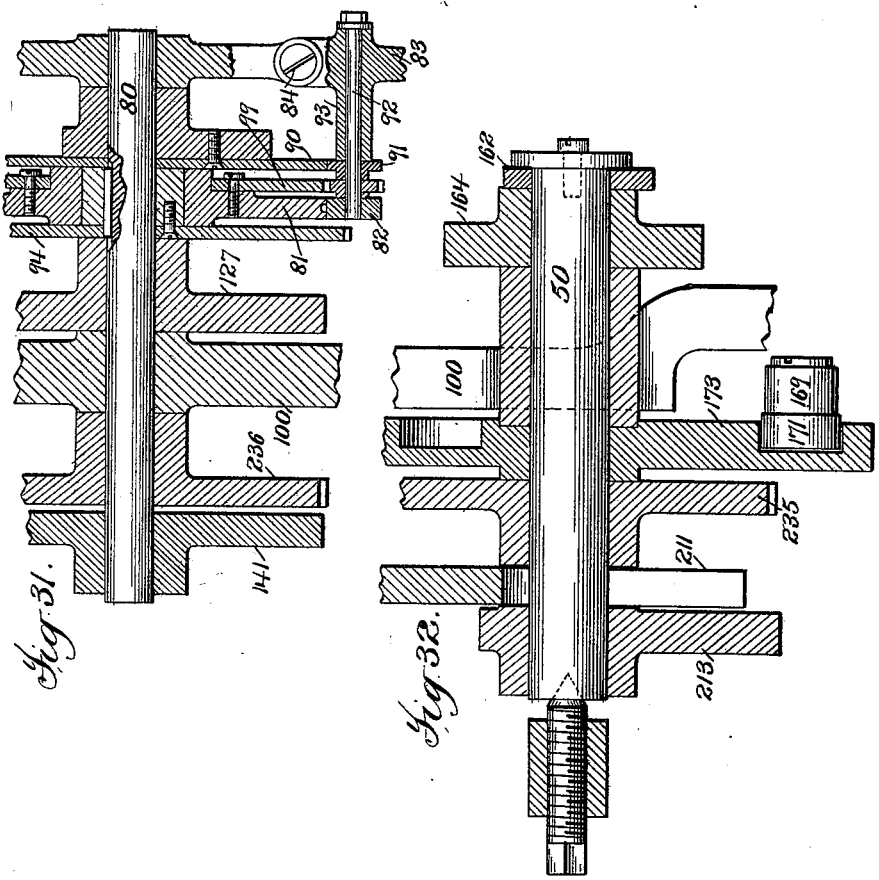
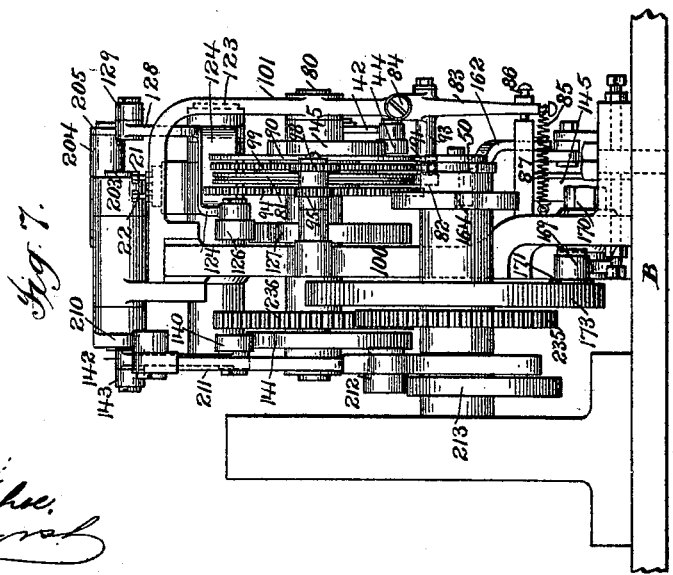

No. 635,356. Patented Oct. 24, 1899.
E. P. SHELDON.
MACHINE FOR WIRING BLANKS.
(Application filed Feb. 18, 1898.)
(No Model.) 16 Sheets—Sheet 7.
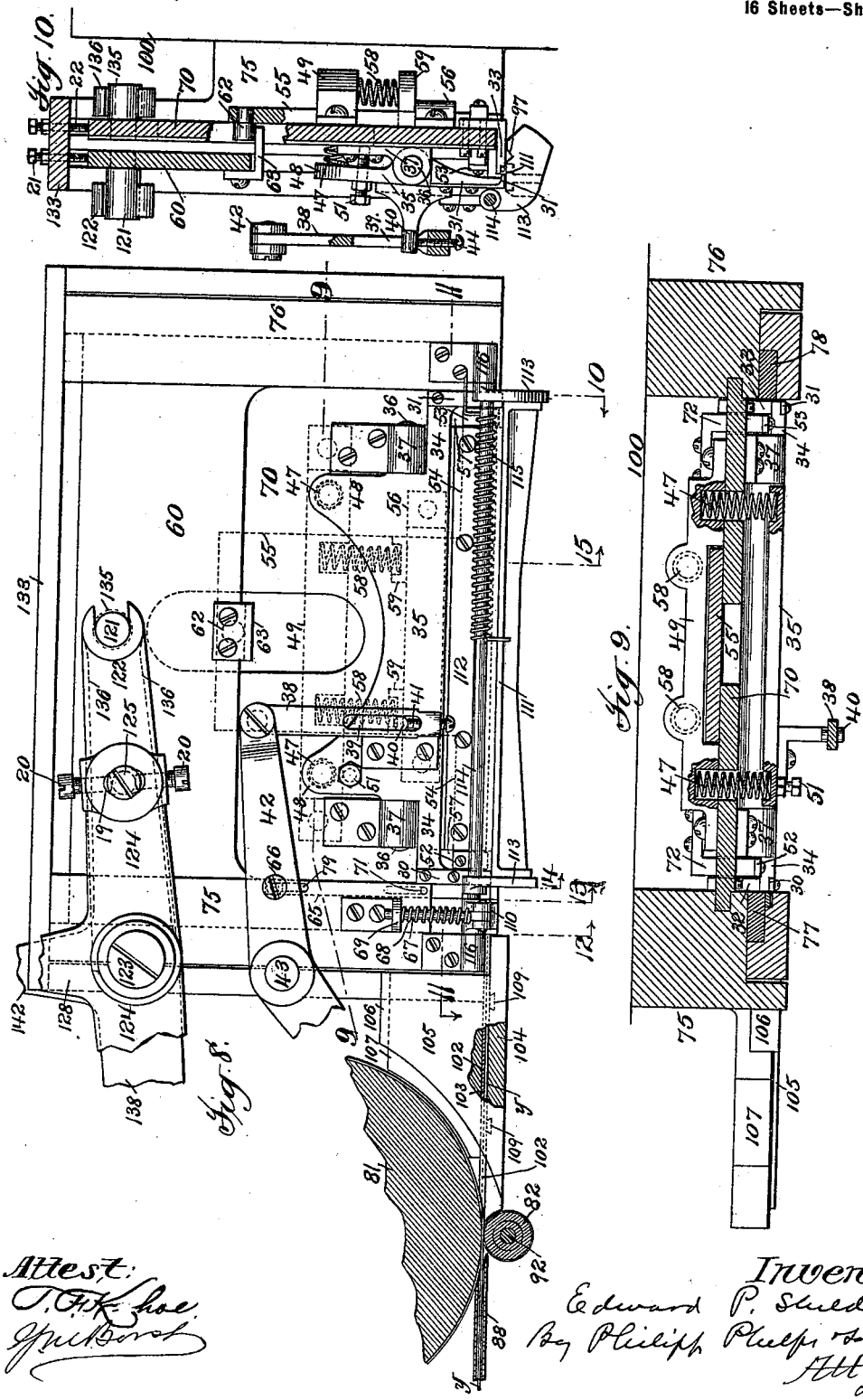
Inventor
Edward P. Sheldon.
By Philipp Phelps
Attys.
Attest:

No. 635,356. Patented Oct. 24, 1899.
E. P. SHELDON.
MACHINE FOR WIRING BLANKS.
(Application filed Feb. 18, 1898.)
(No Model.) 16 Sheets—Sheet 8.
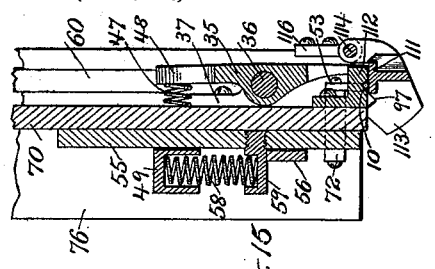
Fig. 15.
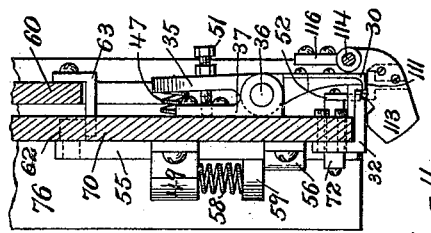
Fig. 14.
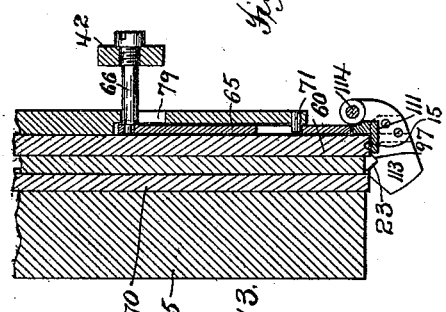
Fig. 13.
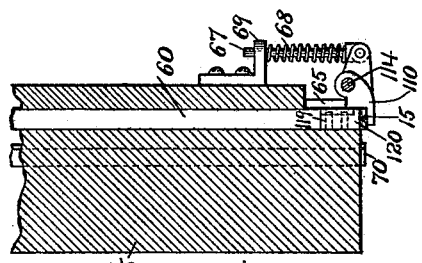
Fig. 12.
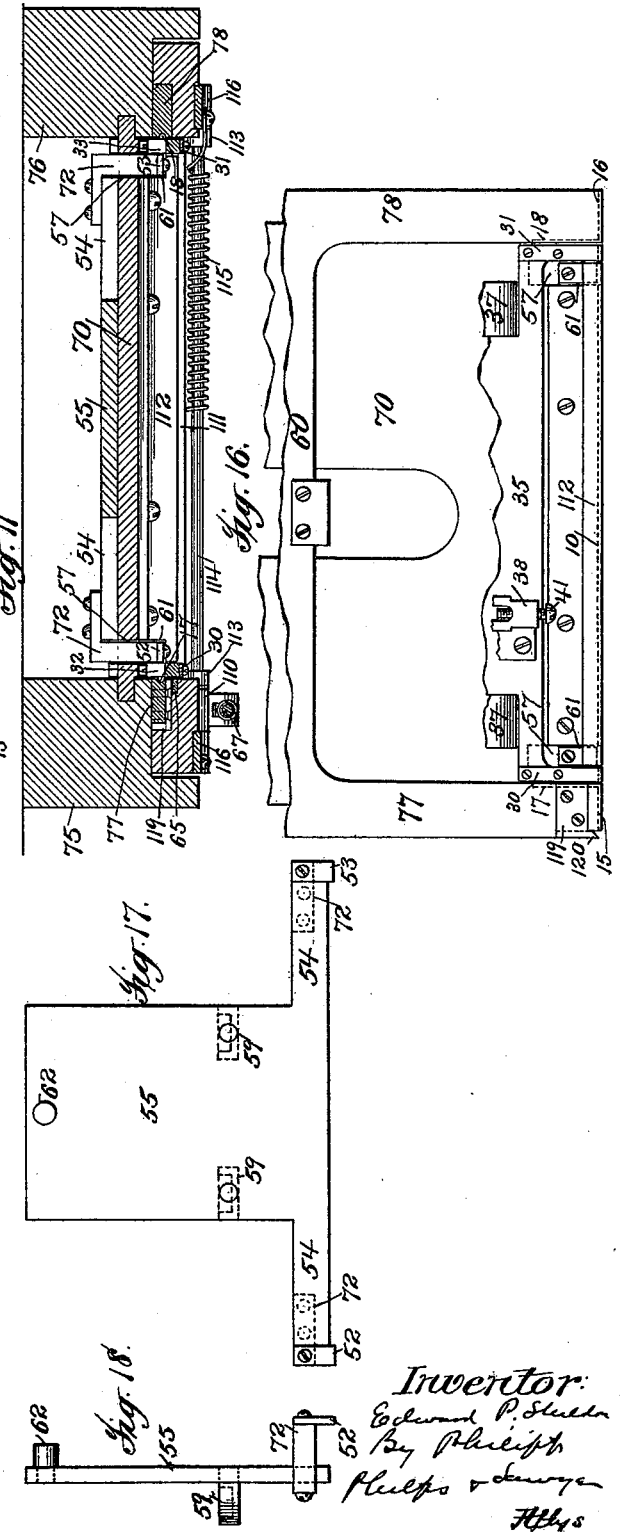
Attest:
A. T. Ashbee
Geo. Borst
Inventor:
Edward P. Sheldon
By Phelps,
Phelps & Sawyer
Attys No. 635,356. Patented Oct. 24, 1899.
E. P. SHELDON.
MACHINE FOR WIRING BLANKS.
(Application filed Feb. 18, 1898.)
(No Model.) 16 Sheets—Sheet 9.
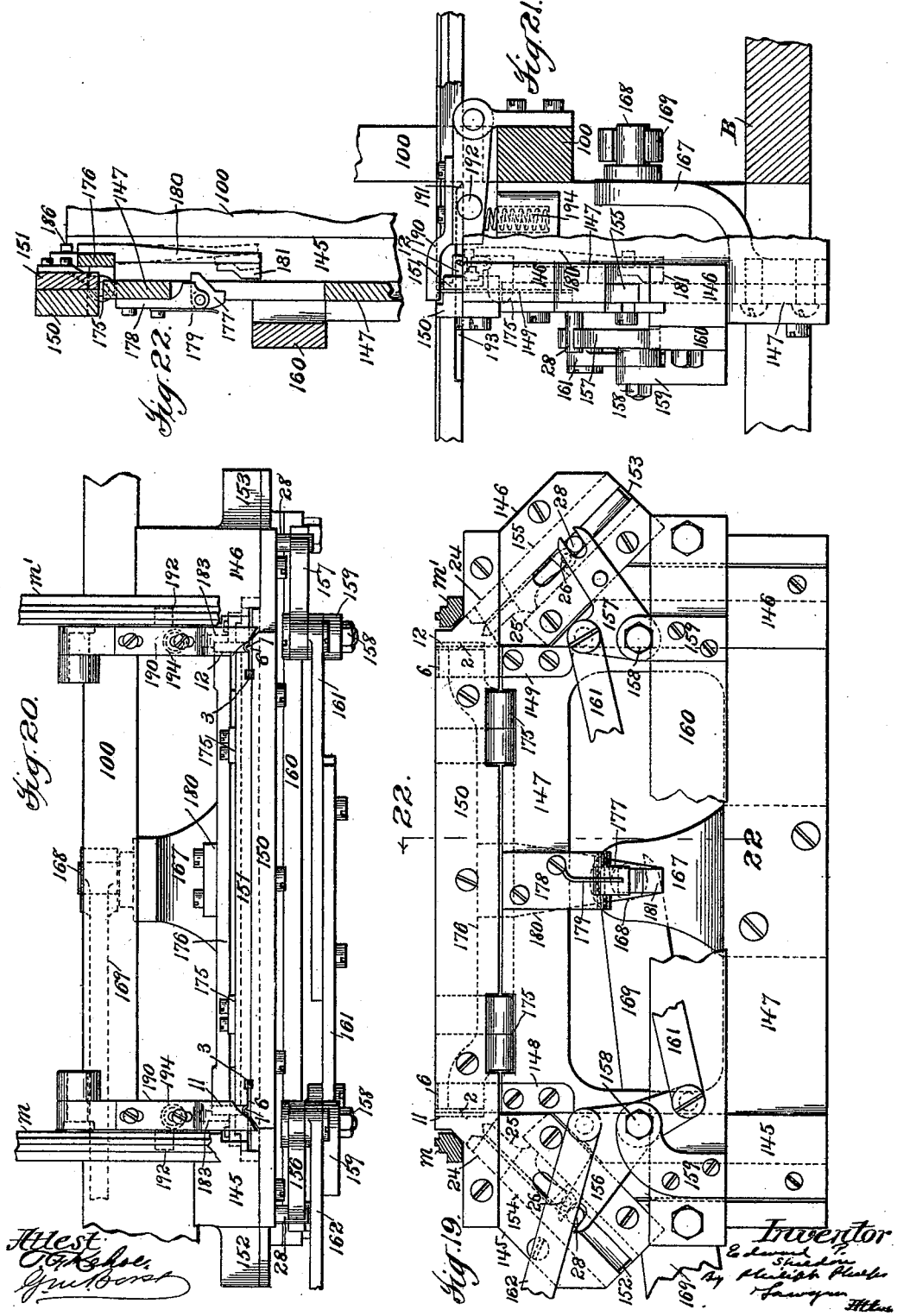

No. 635,356. Patented Oct. 24, 1899.
E. P. SHELDON.
MACHINE FOR WIRING BLANKS.
(Application filed Feb. 18, 1898.)
(No Model.) 16 Sheets—Sheet 10.
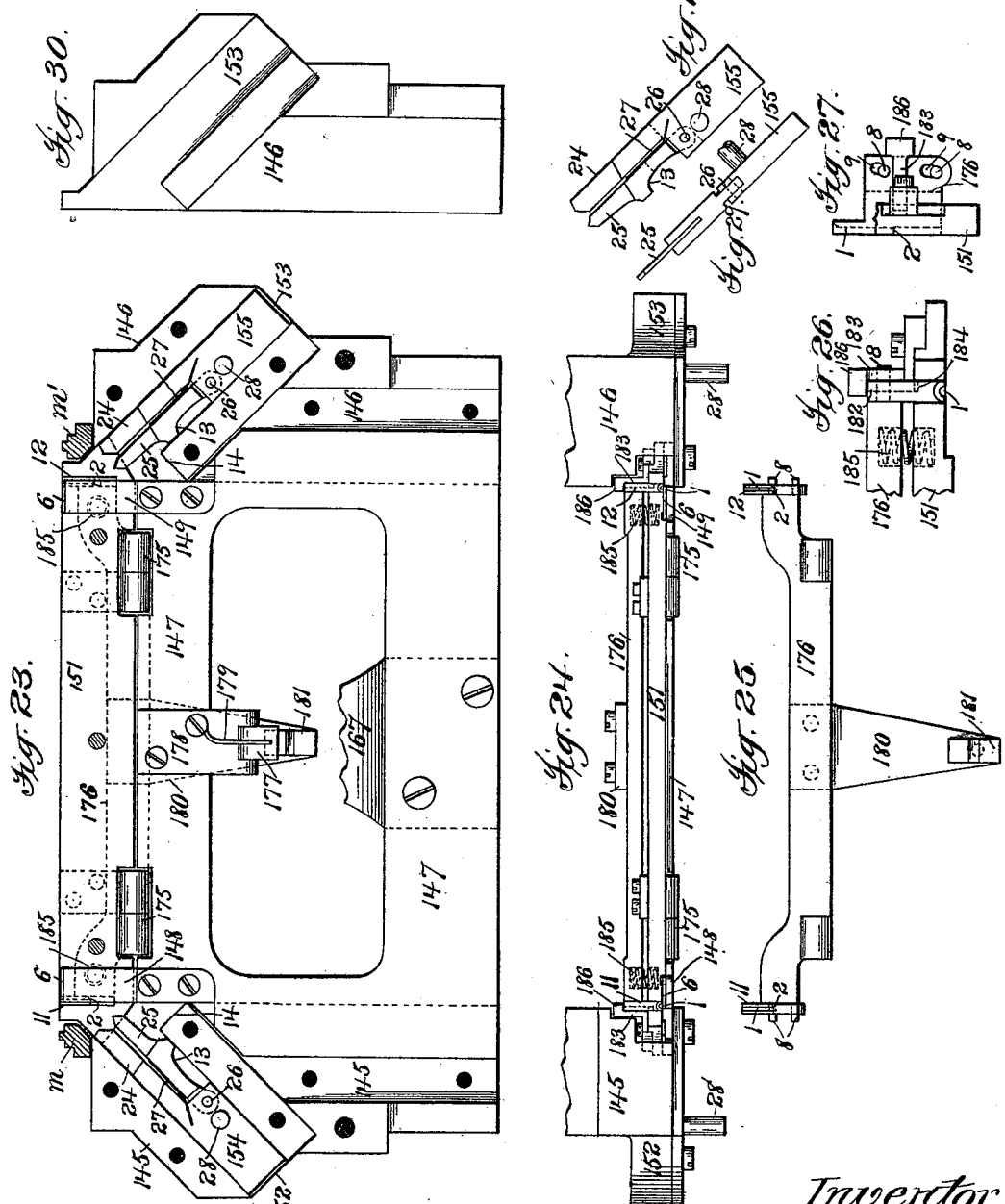

No. 635,356. Patented Oct. 24, 1899.
E. P. SHELDON.
MACHINE FOR WIRING BLANKS.
(Application filed Feb. 18, 1898.)
(No Model.) 16 Sheets—Sheet 11.
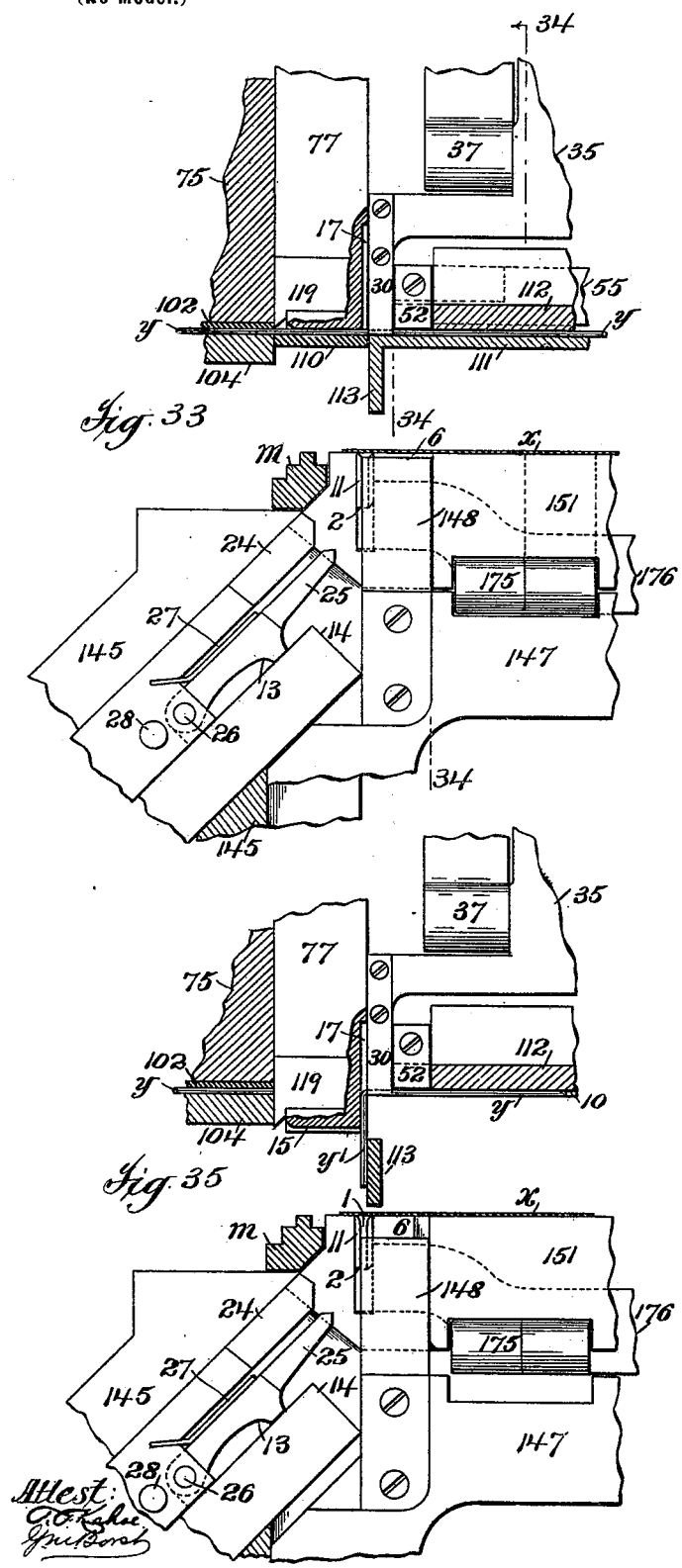
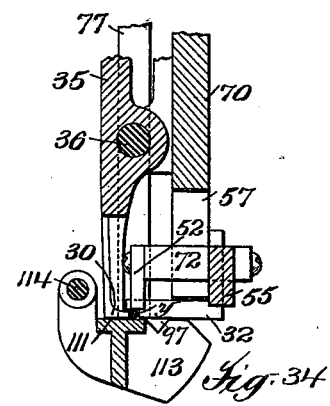
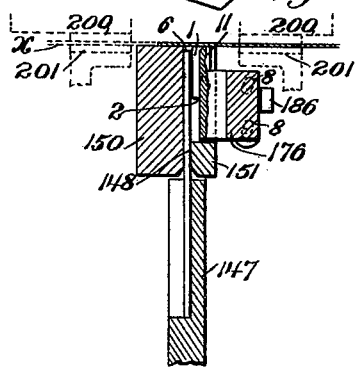
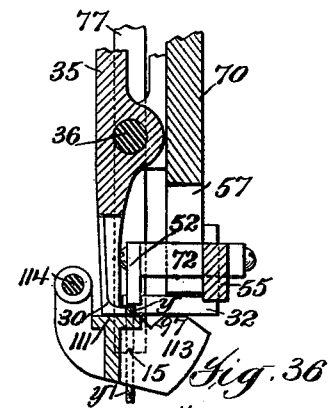
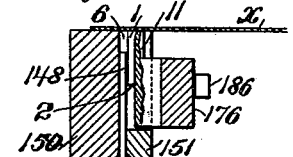

No. 635,356. Patented Oct. 24, 1899.
E. P. SHELDON.
MACHINE FOR WIRING BLANKS.
(Application filed Feb. 18, 1898.)
(No Model.) 16 Sheets—Sheet 12.
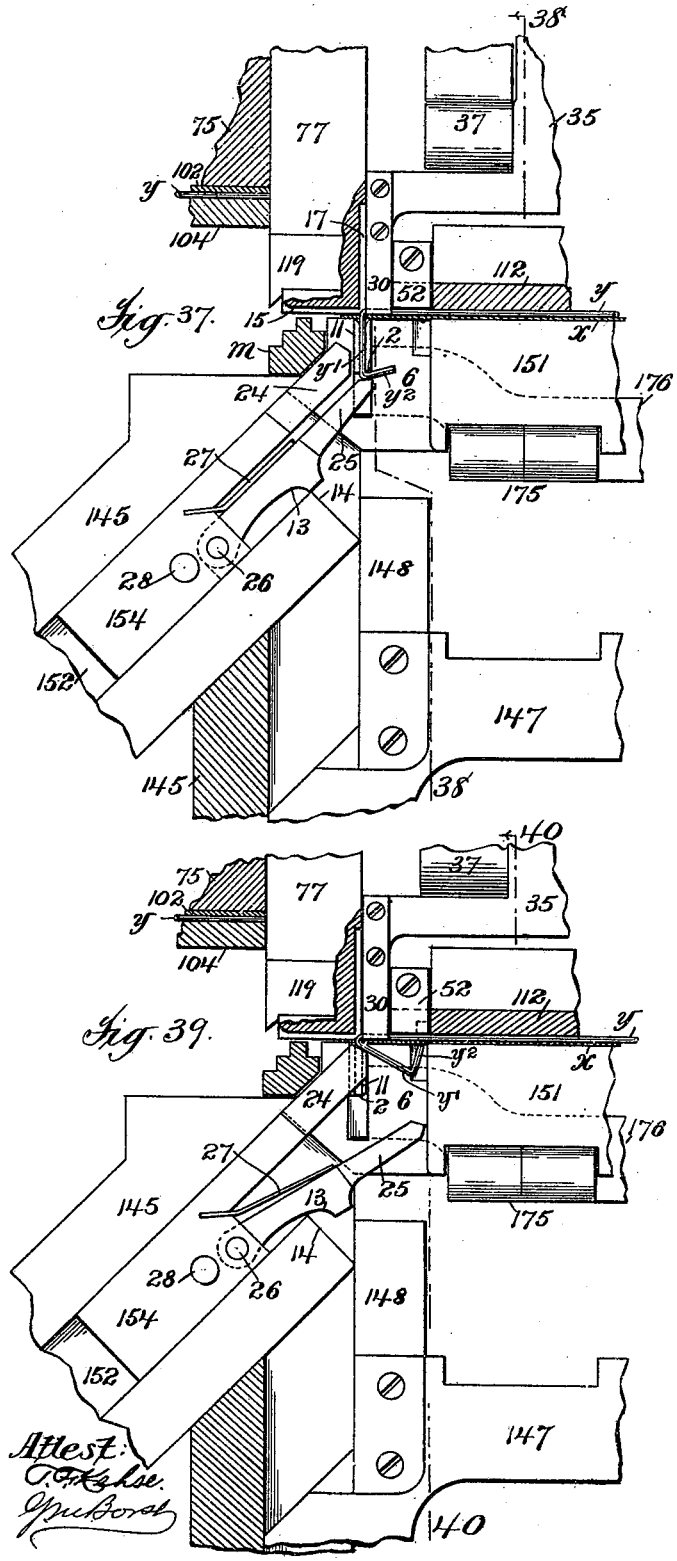
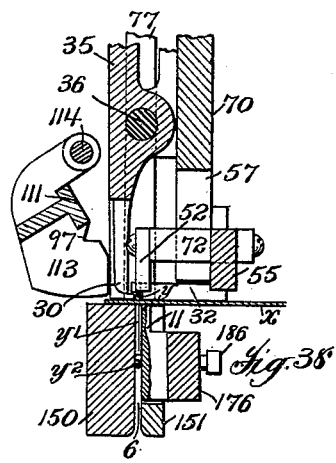
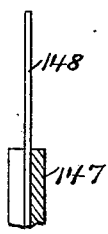
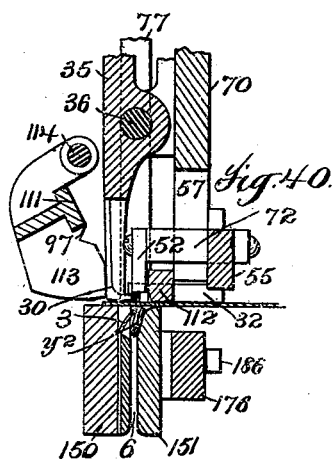

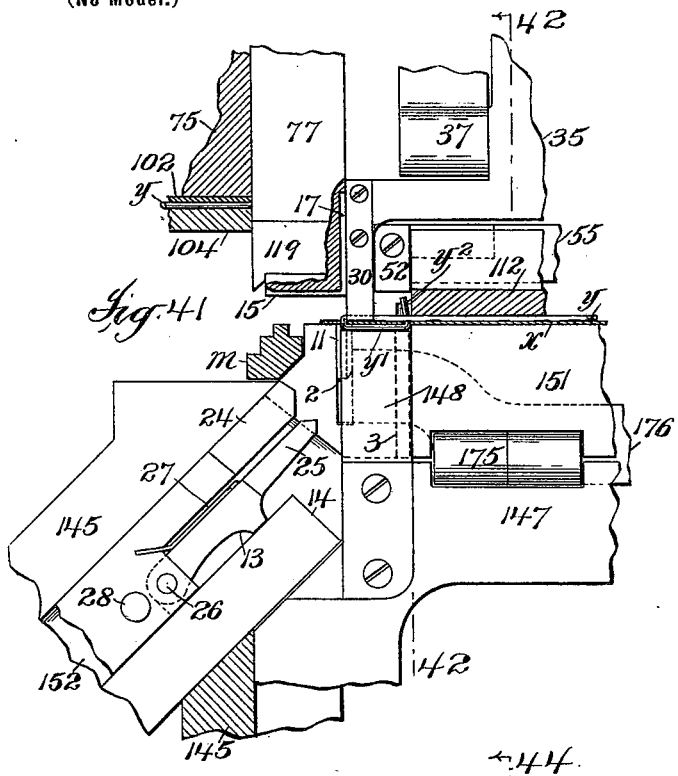

No. 635,356. Patented Oct. 24, 1899.
E. P. SHELDON.
MACHINE FOR WIRING BLANKS.
(Application filed Feb. 18, 1898.)
(No Model.) 16 Sheets—Sheet 14.
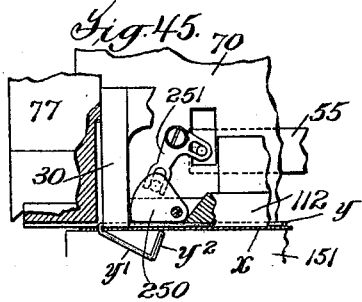
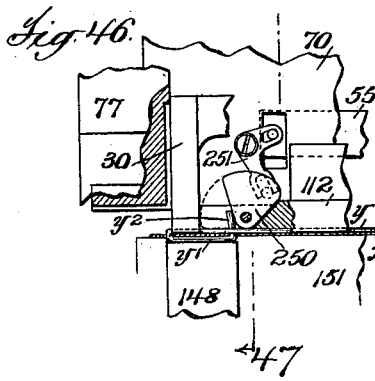
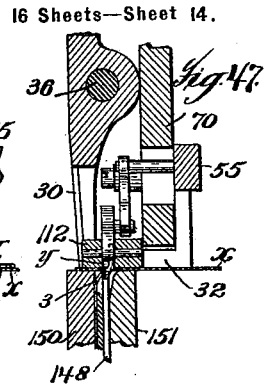
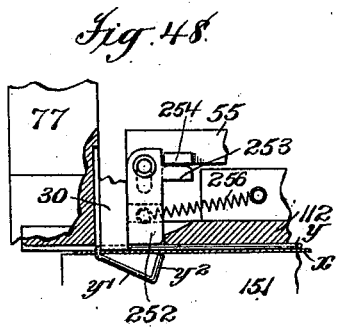
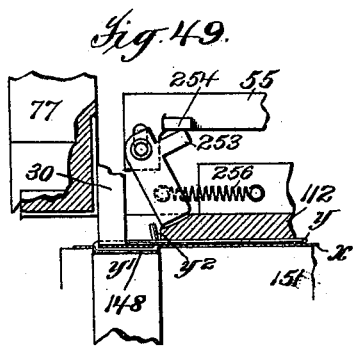
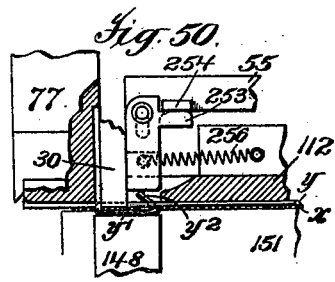
Attest:
T. F. Kehoe.
Jno. Borst
Inventor:
Edward P. Sheldon
By Philipp, Phelps & Sawyer
Attys No. 635,356. Patented Oct. 24, 1899.
E. P. SHELDON.
MACHINE FOR WIRING BLANKS.
(Application filed Feb. 18, 1898.)
(No Model.)
16 Sheets—Sheet 15.
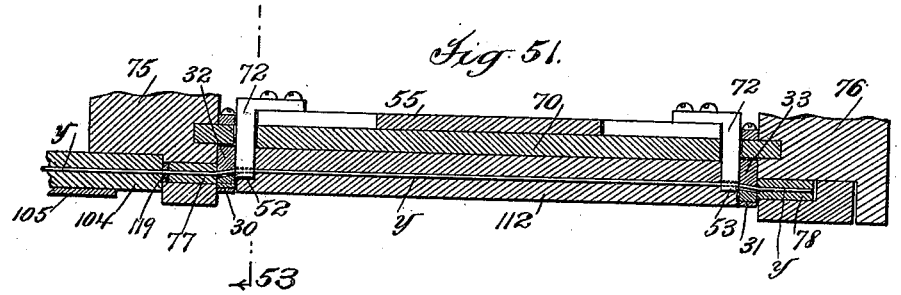
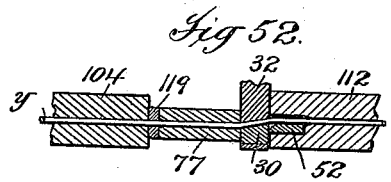
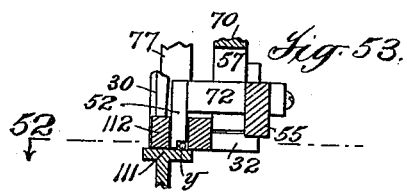
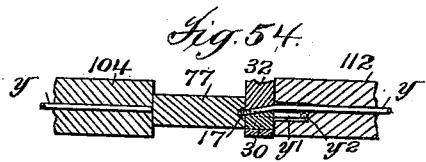
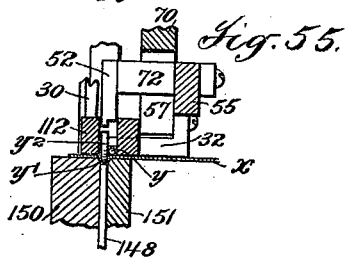
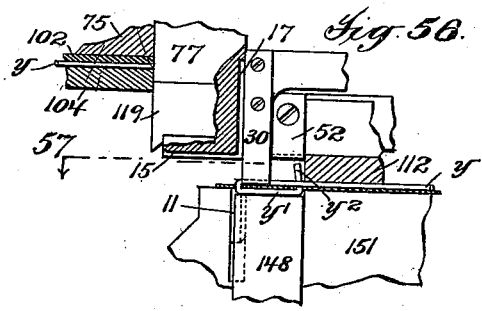
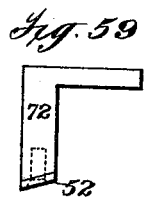
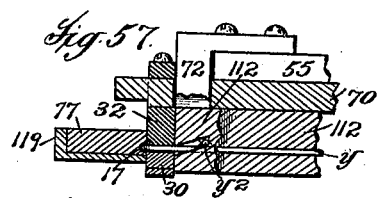
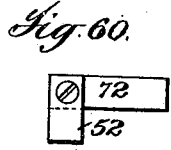
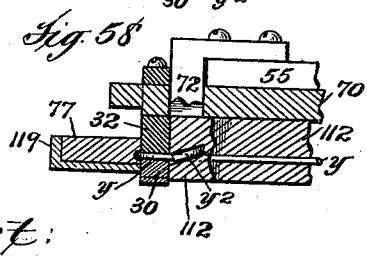
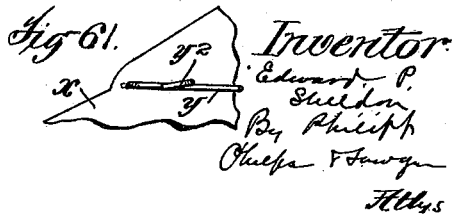
THE NORRIS PETERS CO., PHOTO-LITHO., WASHINGTON, D. C.

No. 635,356. Patented Oct. 24, 1899.
E. P. SHELDON.
MACHINE FOR WIRING BLANKS.
(Application filed Feb. 18, 1898.)

(No Model.) 16 Sheets—Sheet 16.

UNITED STATES PATENT OFFICE.

EDWARD P. SHELDON, OF NEW YORK, N. Y., ASSIGNOR TO FRANK E. MUNN, OF SAME PLACE.

MACHINE FOR WIRING BLANKS.

SPECIFICATION forming part of Letters Patent No. 635,356, dated October 24, 1899.

Application filed February 18, 1898. Serial No. 670,835. (No model.)

*To all whom it may concern:*

Be it known that I, EDWARD P. SHELDON, a citizen of the United States, residing at New York, (Brooklyn,) county of Kings, and State of New York, have invented certain new and useful Improvements in Machines for Wiring Blanks, fully described and represented in the following specification and the accompanying drawings, forming a part of the same.

My invention relates particularly to the attachment of wire openers to blanks from which are to be made or which are to be attached to envelops, wrappers, boxes, or other articles of paper, cardboard, wood, cloth, or other readily-severable material by the use of which such material may be readily cut on a desired opening-line and the package formed thereby opened; and my invention includes the devising and adaptation of mechanism whereby such wire may be mechanically attached to the blank with which it is to be used in such a manner as to enable the wire to be used in cutting the blank for opening the package by pulling on the wire.

While wire openers such as I have above referred to have been heretofore suggested, no mechanism, so far as I am aware, has been devised for mechanically attaching them to blanks. I use the term "mechanically attaching" in this specification and the claims to distinguish from attaching a wire opener to a blank by glue or similar material, as in the case of the string openers applied by such means, for which work machines have been patented and by which machines it has been suggested that wires might be similarly secured.

My invention also includes the organization of a machine wherein the several operations which require to be performed in connection with the attachment of the wire opener to the paper may be automatically carried out. Thus it is generally necessary to apply gum or other adhesive material to the paper blank for making the package, and it is desirable in order to produce a completed product at one operation that the gumming mechanism should be a part of the same machine as the wiring mechanism. It is also frequently desirable to fold the paper after the wire is applied thereto in order to form it into a receptacle.

My present invention therefore includes the devising of an organized machine having in combination mechanism for performing all of these three functions or the wiring in combination with either a gumming or a folding mechanism and also mechanism for transferring the blank from each of said mechanisms to the next. It will, however, be understood that I do not limit myself herein to the use of a gumming or a folding mechanism in connection with the wiring mechanism or to the use of either of these mechanisms in connection therewith. If it is desired, the wiring mechanism may be used by itself or in combination with a gumming mechanism or in combination with a folding mechanism or, as I have shown it herein, in combination with both.

As I am the first, so far as I am aware, to combine mechanism for mechanically attaching a wire opener with either a gumming or a folding mechanism or with both of them, I intend to claim those combinations broadly and without reference to the special construction of any of the mechanisms.

While it is not essential to my invention, broadly considered, that any special type of machine for mechanically attaching the wire opener to the blank or a machine for making such attachment in any special manner should be employed, still it is a part of my invention, considered within narrower limits, to provide a machine which shall be capable of attaching the wire by causing it to penetrate the material twice and bending it down thereafter, so that there shall be three parallel strands of wire at the point of attachment to the paper. To this end my invention includes means for feeding the wire, cutting therefrom a proper length, bending down the ends or an end thereof, and causing the same to penetrate the paper, used in connection with mechanism for causing the bent portion of the wire to again penetrate the paper, and for thereafter bending over the end thereof and clenching the same.

While it is generally desirable to attach both ends of the wire to the envelop in order that it may not be necessary for the person using the opener to make a selection between the ends, nevertheless I do not wish to limit myself to mechanism for attaching both ends, and I intend to include the adaptation of my invention to the attachment of the opener to the blank at one of its ends. Further, some other portion or portions of the wire opener besides the end or ends thereof may be utilized for the attachment of the opener to the blank without departing from my invention.

My invention also includes certain details of construction, which will be hereinafter fully described, and pointed out in the claims.

My invention may be used for attaching a wire opener to any sort of a blank to be used for any purpose. This blank is usually and preferably of paper, but may be of any other suitable material, as cardboard, thin wood, or cloth. The blanks so wired may be applied to any of a large variety of uses, among which I may specify envelops, newspaper-wrappers, labels, or sealing-strips for boxes, &c., some of which uses are set forth in Patent No. 562,336, granted to Frank E. Munn.

In the drawings, Figure 1 is a side view of an envelop-machine with the mechanism for attaching the wire to the envelop mounted on it, the reel for carrying the wire-supply being broken to show other parts of the mechanism. Fig. 2 is a plan view of the envelop-machine and wiring mechanism as shown in Fig. 1. Fig. 2ᵃ is a front view of the wire-reel and wire-take-off mechanism, the view being taken on the line 2ᵃ of Fig. 2 looking in the direction of arrow. Fig. 3 is a longitudinal section of the upper part of the machine, taken on the line 3 3 of Fig. 2, showing the table of the machine and the several mechanisms for gumming, transferring, wiring, and folding the envelops, this view showing the mechanisms on a larger scale than Figs. 1 and 2. Fig. 4 is a horizontal section on the line 4 4 of Fig. 3. Figs. 4ᵃ and 4ᵇ are detail views showing fingers for moving the blank from the gumming mechanism to the folding mechanism. Fig. 5 is a sectional view taken on the line 5 5 of Figs. 1 and 2. This view shows a front elevation of the mechanism for feeding, cutting, bending, and attaching the ends of the wire to the envelop-blank, the different parts being shown in the position they will assume when the operation of attaching the wire to the blank has been completed. Figs. 6 and 7 are respectively a plan and end view of Fig. 5. Fig. 8 is an enlarged view of the upper part of Fig. 5, parts of the mechanism being omitted for the purpose of illustration. Fig. 9 is a horizonal section on the line 9 9 of Fig. 8. Fig. 10 is a section on the line 10 of Fig. 8. Fig. 11 is a horizontal section on line 11 of Fig. 8. Figs. 12, 13, 14, and 15 are vertical sections taken on the lines 12, 13, 14, and 15 of Fig. 8. Fig. 16 is a front view of part of the mechanism illustrated in Fig. 8. This figure shows the wire-cutter, gripping-fingers, and clenchers. Figs. 17 and 18 are respectively a front and edge view of the wire-clenchers and supporting-plate. Fig. 19 is an enlarged view of the lower part of Fig. 5, showing the mechanism for bending the ends of the wire and forcing the same through the envelop-blank to be clenched. Fig. 20 is a plan view of Fig. 19. Fig. 21 is an end view of the same. Fig. 22 is a section on the line 22 of Fig. 19. Fig. 23 is a front view similar to Fig. 22, parts being removed to clearly illustrate the mechanism. This view shows the fingers for bending the ends of the wire preparatory to its being forced through the envelop-blank to be clenched, also the plungers for forcing the ends through the blank and the sliding plate by which the plungers are carried. Fig. 24 is a plan view of Fig. 23. Figs. 25, 26, and 27 are details showing devices for accurately guiding the ends of the wire to be bent. Figs. 28, 29, and 30 are details of wire-bending fingers and support. Fig. 31 is a section taken on the line 31 31 of Fig. 6, showing in detail the wire-feeding devices and mechanism for driving the same. Fig. 32 is a section on the line 32 32 of Fig. 6, showing the cam-shaft and arrangement of cams on the same for operating the several mechanisms. Figs. 33 to 44 are front and sectional views showing the positions of the different parts during different stages in the operation of cutting, bending, and clenching the end of the wire nearest the feeding mechanism, the positions of the parts at the other end of the wire being the same except that there is no cutter at the latter end. Figs. 45 to 47, the last a section on line 47 of Fig. 46, show a modification in which the wire-clencher is pivoted and has a swinging instead of a vertical movement. Figs. 48 to 50 show a swinging clencher of a slightly different construction. Figs. 51 to 55 show a modified construction in which the body portion of the wire length forming the opener is caused to take a position slightly out of line with that portion of the wire length to be bent to form the legs of the opener, this arrangement being for the purpose of causing the wire ends when inserted through the blank for the second time to pass the body portion of the opener without the assistance of a spring or other guide, Fig. 51 being a horizontal section through the wire-channel, Fig. 52 being a section on the line 52 of Fig. 53, Fig. 53 being a section on the line 53 of Fig. 51, Fig. 54 being a horizontal section through a part of the wire-channel just before the clenching of the wire, and Fig. 55 being a view similar to Fig. 53 except that the clencher is just about to descend. Figs. 56 to 61 illustrate another modification in which the clencher and the recess in which it moves are set diagonally, so as to cause the end of the wire length forming the opener to lock across the body portion of the wire when clenched, Fig. 56 being a side elevation, partly in section, of this construction of mechanism, Fig. 57 a sectional view on the line 57 of Fig. 56, Fig. 58 a plan view showing some of the parts after the wire has been clenched and locked, Fig. 59 a plan view, Fig. 60 a front view of the clencher, and Fig. 61 a plan view of one end of the opener attached to the blank after being removed from the machine. Figs. 62 to 65 show a modified construction adapted to bend the ends of the wire when the latter are bent to force the wire through the blank a second time in an outward instead of in an inward direction.

Referring to Figs. 1 to 4, A is the frame of the machine, upon which is mounted the table B. At one end of the table B is mounted the gumming mechanism C and at the other end the folding mechanism D. These mechanisms are operated from the main driving-shaft E by cams and connections, the cams not being shown, but being well known in connection with this form of mechanism. The pile of envelop-blanks X are placed on a feeding-table $a$, said table having a vertical step-by-step feeding movement. Positioned just above the table $a$ and over the blanks are two gumming-fingers $c\ c'$, the bottom surfaces of which receive gum from a duct-roll $d$, reciprocating between two fountain-rolls in gum-boxes $e\ e'$. This duct-roll $d$ is carried by sleeves which slide on the guide-rods $f\ f'$, these sleeves being connected by links to the ends of two vertical rock-arms $g\ g'$, carried on the rock-shaft $h$ and operated through suitable connections by a cam (not shown) carried by the driving-shaft E, as shown in Figs. 1 and 2. The gumming-fingers $c\ c'$ are carried by a cross-bar fixed to a vertical rod $i$, sliding in a bracket $j$. The gum being applied to the bottom surfaces of the fingers by roll $d$, the fingers will be moved downward to apply the gum to the flaps of the envelop blank by means of links $k\ k'$ and rock-arms $l\ l'$, mounted on the rock-shafts $n\ n'$, the rock-shaft $n'$ being rocked by a cam (not shown) on the main shaft E through link $o$. (Partially shown in Figs. 1 and 2.) The fingers $c\ c'$ reciprocate vertically through openings in the horizontal plate $p$, connecting the gum-boxes. When the gumming-fingers have applied gum to the blank, they will then retreat and move upwardly, carrying the blank with them, it being held fast to the fingers at this time by the gum. The fingers move up until the blank has been positioned over and into the path of a reciprocating carrier M, consisting of two rods $m\ m'$. When the carrier M has arrived under the raised blank, the blank will be stripped from the fingers $c\ c'$ by means of the plate $p$, through which the fingers rise, and by rocking fingers $q\ q'$, mounted on the rock-shaft $r$, these fingers operating to lay the blank on the carrier-arms $m\ m'$. This shaft $r$, which is rocked from the shaft E through suitable connections, also actuates the pawl-and-ratchet feeding movement $b$ of the table $a$ through arms $s\ s'$. The blank will now be dropped onto the carrier M, which runs quite close to the stripping-plate $p$, so that the distance the blank drops is very slight. The carrier will then be moved to the left, (see Fig. 1,) first to the wiring mechanism and then to the folding devices D, where the blank will then be folded to envelop form by the plunger I and folding-wings J (see Fig. 3) in the usual manner. The carrier M is reciprocated between the gumming and the folding devices by means of link $t$, arm $t'$, cam-lever $u$, and cam $v$ on the driving-shaft E, as shown in Fig. 1.

The mechanism for attaching the wire to the blank will now be described in detail, reference being had first to Figs. 5, 6, and 7, which show the several mechanisms assembled for that purpose.

Adjustably secured to the table B of the machine is a supporting-frame 100, in which is mounted one end of a shaft 80, the other end being supported in an overhanging bracket 101. Loosely mounted on the shaft 80 is a wire-feeding disk 81, having a groove formed in its periphery to guide and retain the wire $y$ in proper position. A second smaller feeding-disk 82, below the disk 81, coöperates with said disk to feed the wire across and over the envelop-blank at the proper time, the disk 82 being mounted on a swinging arm 83, which is pivoted at 84 on the bracket 101 and normally held in engagement with the disk 81 by a spring 85, fast at one end to the lower part of the arm 83 and at the other end to the frame 100. The arm 83 carries an adjusting-screw 86, which engages a stop 87 for properly adjusting the disk 82 with relation to the disk 81. The wire $y$ is fed in a continuous strand from the wire-reel Y in a manner hereinafter described to a guiding-tube 88, thence between the feeding-disks 81 82, which feed the proper amount of wire required, when the lower disk will be swung downward outwardly on the pivot 84 by a cam 90, fixed to shaft 80 and which engages a disk 91, fixed to the stud 92, which is carried in a sleeve 93, formed on the swinging arm 83, the stud 92 also carrying the feeding-disk 82, as shown in Figs. 7 and 31.

The different parts of the mechanism shown as carried by the shaft 80 are so arranged that the feeding-disk 81 will feed the proper length of wire during one-third of a revolution of the shaft 80, leaving two-thirds of each revolution for the other parts to perform their work, as hereinafter described. As one-third of the circumference of the feeding-disk 81, as it is shown, would not be sufficient to feed the length of wire necessary if driven by shaft 80, it is, as previously stated, mounted to rotate freely on shaft 80 and is driven at a higher rate of speed than said shaft by means of a gear-wheel 94, keyed to the shaft 80 and meshing with a pinion 95, mounted loosely on a short shaft 96, fixed in the frame 100 and connected by a short sleeve 97 to a larger pinion 98, which engages a gear-wheel 99, somewhat smaller than the wheel 94, said wheel 99 being fast to the feeding-disk 81. This form of gearing, as will be seen, gives to the disk 81 a higher rate of speed than the shaft 80 and a sufficient contact with the disk 82 to feed the right length of wire before the cam 90 operates to throw the disk 82 out of engagement with the disk 81. The feeding-disk 82 is driven at the same surface speed as disk 81 by a pinion which meshes with the gear 99 of the feeding-disk 81.

The wire is fed from the feeding-disks 81 82 through a guideway formed of a plate 102, having a groove 103 along its bottom face for the passage of the wire, the wire being held in the groove 103 by an inwardly-extending bottom flange 104, formed on a removable cap-plate 105, which has a top flange 106 resting on a fixed abutment 107 and held in position by a pivoted arm 108, as shown in Figs. 3, 5, and 8. The guide-plate 102 is fixed accurately to the flange 104 by dovetailed projections 109, formed on the bottom face of the plate 102, these projections entering corresponding grooves in the flange 104.

The mechanism for cutting and giving the first bend to the ends of the wire and the devices for holding the same in position while being cut and bent and for moving the bent wire down and through the envelop-blank will now be described, reference being had particularly to Figs. 5 to 18.

The wire on being fed will pass over a short swinging table 110, thence over a long swinging table 111, underneath a top plate 112, having a groove 10 formed in its lower side the entire length of the table, the tables 110 111 and plate 112 forming bottom, top, and side guides for the wire as it is being fed. The swinging table 111 has at either end a plate 113, by which it is swung outward and away from the plate 112 in a manner hereinafter referred to. The tables 110 111 are pivoted on a stationary bar 114, having a coiled spring 115 mounted on it, the inner end of said spring 115 bearing against the table 111, and the other end is fast to one of the bearings 116 of the bar 114, the tendency of the spring being to normally press the table 111 upwardly against the bottom face of the plate 112. The short table 110 forms a short bridge for the passage of the wire between the end of the guide-plate 102 and the inner end of the table 111.

Fixed onto the frame G are two vertical guiding-blocks 75 76, having guideways formed in them, in which reciprocate vertically two sliding plates 60 70. The sliding plate 60 has at its ends, as shown in Fig. 16, two downwardly-extending legs 77 78, the inner one, 77, carrying a cutter-plate 119, set in flush with the surface of the legs and having a cutting edge 120 normally resting just above the line of movement of the wire, as shown in Figs. 11, 12, and 16. The legs 77 78 are each grooved horizontally on their lower edges at 15 and 16 and vertically on their inner edges at 17 18, as shown in Figs. 11 and 12 and in dotted lines in Fig. 16, the horizontal groove 15 forming a top and side guiding-surface for the wire during its passage across the table 110 and the groove 16 a top and side guiding-surface for the end of the wire which passes beyond the table 111, the portions of the wire resting in these grooves being those portions by which the wire is attached to the blank. The vertical grooves 17 18 on the inner edges of the legs 77 78 receive and guide the bent portion of the wire after being cut and during the downward movement of the slide 60 to perform such bending, as shown in Fig. 35.

The sliding plate 60 is moved toward and away from the blank which rests on the carrier-arms m m' (see Fig. 5) in the following manner: At the upper end of the plate 60 is fixed a stud 121, which is engaged by the forked end of an arm 122, mounted loosely on a rock-shaft 123, journaled in the guide-block 75. The arm 122 is rocked by a second lever 124, which is also loosely journaled on the rock-shaft 123 outside the arm 122. The outer end of the lever 124 engages a stud 125, fast to the arm 122 and which, as shown, is positioned about midway on the arm between the stud 121 and the rock-shaft 123. The end of the lever 124 has a slot 19 formed in it, through which the stud 125 passes and upon which bear the inner ends of two set adjusting-screws 20. The inner end of the lever 124 carries a bowl 126, which engages a cam-disk 127, carried by the shaft 80 and so formed and positioned on the shaft 80 that the slide 60 and parts coacting with said slide will commence to operate at the proper time—that is, just after the wire y has been fed into position across and over the blank x. It will be seen that by having the arm 122 separated from and operated by the lever 124 through the adjusting-screws 20 a nice adjustment is obtainable for the slide 60 and coacting parts. The lever 124 has an upwardly-extending portion 128, to which is pivoted a spring-rod 129, carrying a spring 130, bearing at one end against an abutment 131, fixed to the guide-block 76, and the other end bearing against a collar 132 on the rod 129. The spring 130 thus tends to hold the bowl 126 into engagement with the cam 127 and raise the slide 60 when the operation has been completed. The guide-blocks 75 76 have secured to their top surfaces a plate 133, which carries adjusting-screws 21, the lower end of said screws being so positioned as to engage the upper edge of the slide 60, thus insuring a correct position of the lower edges of the legs 77 78 relatively to the wire. The wire is held firmly in position while the several operations on it are being completed by two gripping-fingers 30 31, which grip the wire against the stationary blocks 32 33, fast to sliding plate 70. There are thus formed two grippers for the two ends of the wire lengths, respectively—viz., finger 30 and block 32 and finger 31 and block 33— the two grippers being positioned at the two ends, respectively, of the cut-of portion of the wire x at the point where the first bending down of the ends of the wire takes place. Each of the gripping-fingers 30 31 is fast to arms 34, carried by a swinging plate 35, having studs 36 journaled in brackets 37, fast to the sliding plate 70. The gripping-fingers 30 31 are normally held out of engagement with the wire—that is, while the wire is being fed across the table 111—by means of an arm 38, having a slot 39, through which a pin 40, carried by the plate 35, passes and is engaged by an adjusting-screw 41 in the bottom of the arm 38. The upper end of the arm 38 is pivoted to one end of a lever 42, journaled on a stud 43, fixed in the guide-block 75. The other end of the lever 42 carries a bowl 44, engaging a cam-disk 45, carried by the shaft 80. The bowl 44 is held into engagement with the cam 45 by a spring 46, one end of which is fast to the lever 42 and the other to the bracket 101, the cam operating to raise the arm 38 and through pin 40 swing the upper part of the plate 35 inward and the gripping-fingers 30 31 outward away from the wire. When the wire has been fed to the required length, the form of the cam will immediately allow the spring 46 to actuate the lever 42 to lower the arm 38 away from the pin 40 and allow the plate 35 to be swung on its bearings and throw the gripping-fingers 30 31 inward to grip and hold the wire. The plate 35 is swung in this manner by two springs 47, the ends of which enter openings in two projections 48 of the plate 35, the other ends entering openings in a bracket 49, carried by the sliding frame 70, the springs 47 acting to throw the upper part of the plate 35 out and the lower part thereof, carrying the gripping-fingers 30 31, inwardly to grip the wire against the action of the cam 45, which, as previously described, acts to open the gripping-fingers. The grippers retain their hold upon the wire until the latter is driven and clenched. An adjustable stop 51 is fixed on the plate 35 to limit the outward movement of the gripping-fingers. The mechanism which has been thus far described consists of the feeding, gripping, and cutting mechanism and the parts by which the first or initial bending is imparted to the ends of the wire. The wire, with the ends bent down, as shown in Fig. 35, is now moved down to the blank, the bent ends of the wire are forced through the blank, and said ends are then operated upon by a separate mechanism for bending up a portion of the previously-bent-down ends and forcing the last-mentioned bent-up portions upward through the blank to be clenched over and down on said blank, as shown in Figs. 41 and 43.

The mechanism for the final clenching of the ends of the wire will now be described, as it forms a part of and coacts with the mechanism which has just been described in detail.

The clenching is done by two clenching-fingers 52 53, carried by arms 54, extending outwardly from a sliding plate 55, which rests on the rear surface of the slide-plate 70 and is moved up and down in the bracket 49 and bracket 56, (below the bracket 49,) both brackets being fast to the sliding plate 70. The clenching-fingers 52 53 are fastened on the arms 54 by brackets 72, which extend through and outwardly from the plate 70 to position the clenching-fingers directly over the wire passing through openings 57 in the plate 70. The clenching-fingers 52 53 and plate 55 are normally pressed downward by springs 58, the upper ends of which engage the bracket 49, the lower end bearing against abutments 59, fast to the plate 55, which carries the clenchers 52 and 53 to a position where the clenchers are just above the wire, where they form an upper guiding-surface for the wire between the gripping-fingers 30 31 and pieces 32 33 and the edge of the cut-away portion 61 of the plate 112. A stud 62, which is fixed to the upper part of plate 55, is engaged by plate 63, fast to the sliding plate 60, for the purpose of lifting the plate 55 and clenchers 52 53 against the pressure of springs 58 to allow that portion of the wire to be clenched to enter below it as it is forced upward through the blank. As shown in Fig. 5, the cam 127 has a cut-away portion 64 to allow the sliding plate 60, carrying the plate 63, to be raised at the proper time for the purpose just set forth. After an interval sufficient to permit the wire to be forced up through the blank the cam 127 will again move the plate 60 downward and the spring 58 will force plate 55 and the clenchers 52 53 down and clench the wire.

The parts forming the mechanism just described are clearly illustrated in Figs. 8 to 17.

The mechanism for moving the sliding plate 70 and its coacting parts toward and away from the blank is as follows: The plate 70 carries at its upper end a stud 135 directly in the rear of stud 121 of the plate 60. This stud 135 is engaged by the forked end of a lever 136, fast to the rock-shaft 123 inside the frame 100 by a set-screw 137. The rock-shaft 123 is rocked by means of lever 138, fast to the outer end of the shaft 123 by a set-screw 139, the lever 138, carrying at its end a bowl 140, engaging a cam 141 similar to the cam 127, which operates the slide 60, the cut-away portion 64 of the cam 127 being omitted from the cam 141. The levers 136 138, bowl 140, and cam 141 of the slide 70, being directly back of levers 122 124, bowl 126, and cam 127 of the plate 60, do not show in Fig. 5, but are shown in Figs. 6, 7, and 8. The lever 138 has an upwardly-extending portion 142, to the upper end of which is pivoted a spring-rod 143, carrying a spring 144, one end of which bears against the abutment 145, fixed to the frame 100, the other end bearing against a collar 146, fast to the rod 143, the spring acting to raise the sliding plate 70 and the cam 141 to lower it as described previously in connection with the sliding plate 60. The plate 133 at the top of the guide-blocks 75 76 has adjusting-screws 22 to accurately position the sliding plate 70 in its upper position in the same manner as the screws 21 position the plate 60. When the sliding plates 60 70 commence to move down toward the blank, it is necessary that the tables 110 111 should be swung out of the path of the wire as it is carried down to the blank. This is accomplished in the case of the table 111 by the gripping-fingers 30 31, the lower ends of which bear directly on the upper edges of the end plates 113 of the table 111, as shown in Figs. 8 and 14. The sliding plate 60 starts to move a little before the sliding plate 70 to allow the cutter 119 to sever the wire and the sliding legs 77 78 to bend the ends $y'$ of the wire down against the outer sides of the swinging plates 113 before plate 70 moves. The plate 70 will then descend with the gripping-fingers, forcing the plates 113 and table 111 down and out of the path of the wire $y$, as shown in Fig. 38. The plates 113 are notched, as shown at 97. This notch 97 is so formed that when the bearing lower ends of the grippers 30 31 have swung the plates 113 down and outward for part of the distance through which the said plates are moved thereby the ends of the grippers will enter the notches 97 and permit the plates 113 to dwell in the position in which they support the inner sides of the downwardly-bent portions $y'$ of the wire. The table 110, which extends from the wire-guide 102 to the table 111 just described, is thrown out of the path of the end of the wire $y'$ as it is being bent down by the leg 77 of the plate 60 by the lower end of a depending arm 65, Fig. 13, pivoted at 66 to the arm 42 on the rock-shaft 43. The arm 42 operates to allow the grippers 30 31 to be closed immediately after the wire is fed in, as previously described. As the end of the arm 42 is moved downwardly by the spring 46 it will carry the arm 65 down and move the table 110 down and out in the same manner that the table 111 is moved. As the arm 42 moves upward again the table 110 will be returned by a spring-rod 67, pivoted to the table 110 and having a spring 68, the ends of which engage, respectively, the table 110 and a bracket 69, fixed to the guide-block 75. The arm 65 is fitted in a groove formed in the outer portion of the guide-block 75, which has a slot 79 cut in it to allow the pivot 66 to move downward. The lower end of the arm 65 is slotted to engage a pin 71 for properly guiding the arm 65 in its movement, as shown in Figs. 8 and 13.

The description thus far has had reference to that part of the mechanism which lies above the envelop-blank or the parts which in operation come into contact with what constitutes the inner surface of the envelop when folded. The description to follow will refer to that part of the mechanism which lies below the envelop-blank or the parts which come into contact with the outer surface of the envelop when folded.

Referring particularly to Figs. 5 and 19 to 28, there are fixed to the frame 100 two guide-blocks 145 146, in which moves a sliding plate 147, sliding in guideways formed in said guide-blocks 145 and 146 and carrying at its upper part, on either side, two driving-plates 148 and 149, moving in openings 6, with which the downwardly-extending ends $y'$ of the wire enter, these openings being formed between two fixed plates 150 151, fast to the guide-blocks 145 146. The upper parts of the guide-blocks 145 146 have formed in them two oblique guide-ways 152 153, in which move two sliding blocks 154 155, each carrying a rigid wire-bending plate 24 and a swinging wire-bending plate 25, pivoted at 26 in the sliding blocks 154 155, each of the swinging benders 25 being normally pressed inwardly by a flat spring 27, as shown clearly in Fig. 23. The sliding blocks 154 155 each have fast to them a stud 28, which studs are engaged by the forked end of two rocking levers 156 157, fulcrumed at 158 on brackets 159, mounted on a plate 160. These levers 156 157 are connected together by a link 161, one end of which is pivoted to the lever 156 at a point below its fulcrum 158 and the other end to the lever 157 above its fulcrum 158, as shown in Figs. 5 and 19. The levers 156 157 are rocked simultaneously to move the sliding blocks 154 155 upward in an oblique direction by a cam-rod 162, having a forked outer end spanning shaft 50. The rod 162 carries a bowl 163, which engages a cam 164, carried by the shaft 50. The parts just described are returned to their normal position by a spring 166, one end of which is fast to the lever 157 and the other end to the table B of the machine. (See Fig. 5.) The swinging benders 25 are cut away on their under surfaces, as shown at 13, for the purpose of allowing the benders to be moved downward on the pivots 26 by the springs 27 when they have reached the end of their upward movement, as shown in Figs. 37 and 39, the guideways 152 and 153 being cut away, as shown at 14, for this purpose. The sliding plate 147, carrying the driving-plates 148 149, is moved toward and away from the blank in the following manner: The sliding plate 147 has fixed to its lower part a bracket 167, extending upwardly and carrying a stud 168, which is engaged by the forked end of a lever 169, fulcrumed on the frame 100 at 170, the other end of the lever 169 carrying a bowl 171, which runs in a cam-groove 172 in a cam-disk 173, carried by the shaft 50, this cam 172 being a path-cam, which both raises and lowers the sliding plate 147 at the proper time, as will be seen by reference to Fig. 5.

As the wire to be operated on is very small in diameter, it will be apparent that the guiding of the wire as it is being moved and operated upon should be of the greatest accuracy. It has been described previously how this guiding is done in the passage of the wire from the feeding-disks 81 82 to the point where the ends are about to pierce the blank and be moved down into the openings 6, which receive and retain them, while the benders 24 25 and the drivers 148 149 operate upon them. The guiding of the ends $y'$ into the opening 6 and holding it there in the proper position is done by two movable guide-blocks 11 12, details of which are shown in Figs. 26 and 27. These guide-blocks 11 12 are adapted to be moved into and out of the path of the wire in the following manner, (see Figs. 19 to 27:) Hinged at 175 to the plate 151 is a swinging plate 176, carrying at each of its upper ends pins 8, riding in slots 9 in the guiding-blocks 11 12. The plate 176 is rocked by a pawl 177, pivoted to a bracket 178, carried by the sliding plate 147, as shown in Figs. 22 and 23, the upper edge of the pawl 177 being normally held in a horizontal position against the bracket 178 by the spring 179. The plate 176 carries a downwardly-projecting arm 180, having at its lower end an abutment 181, which on the downward movement of the plate 147 and pawl 177 will be engaged by the pawl 177 and be rocked outward, as shown in dotted lines in Fig. 22. This swinging of the lower part of the arm 180 outward will throw the plate 176 inward, thereby causing the pins 8 to move the guide-blocks 11 12 inward and bring a groove 1, formed in the guide-blocks, into the path of the end $y'$ of the wire and directly below it. This will occur just before the ends of the wire reach the blank and while the plate 147 and drivers 148 149 are retreating to allow the ends of the wire to enter the openings 6. The guide-blocks 11 12 are guided in a horizontal direction by ribs 182, formed on stationary blocks 183, entering grooves 184 in the blocks 11 12. The groove 1 extends down only a portion of its length, it being cut away, as shown at 2, to allow the portion $y^2$ of the ends $y'$, which are to be clenched onto the blank, to be bent up by the benders 25, the lower edge of the cut-away portion 2 being the bending-point of said ends $y^2$. When the benders 24, which make a still further bend in portions $y'$ of the ends, are ready to move, the guide-blocks 11 12 are thrown out of the path of the benders 24 until their inner edges are flush with the outer surfaces of the openings 6 by springs 185, placed between the plate 151 and the swinging plate 176, which carry the guide-blocks 11 12, the outward movement of said guide-blocks being limited by the stops 186 on the blocks 183.

When the drivers 148 149 operate to force the ends $y^2$ of the wire upward through the blank, as shown in Figs. 39 to 42, said ends may tend to rise and abut against the under side of the overlying wire $y$, which is resting on the top of the blank $x$ if they were not guided to one side of said wire. To accomplish this, a thin flat spring 3 is fixed in the plate 151, the upper end of which spring extends beyond the edge of the overlying wire $y$, and as the end $y^2$ is moved up the spring forces it to one side, so as to allow it to pass the wire $y$ freely and then be forced down and clenched alongside of the wire $y$.

While the wiring of the blank is being done, as an aid to hold the blank in correct postion until the operation is completed and also to emboss the blank, which is frequently desirable, an embossing mechanism is employed. This mechanism may be of any suitable construction, that shown consisting of two upper reciprocating male dies 200 and two lower stationary female dies 201, one fast to the inside of the plate 160 and the other attached to plate 150, the dies being so arranged as to emboss the blank on the flap and the body of the envelop on either side of the wire $y$. When the blank has been moved to the wiring position, the upper dies are immediately moved down and engage the lower dies, thus holding the blank between them. The upper dies are actuated by a rock-arm 202, carried by a rock-shaft 203 and having a sleeve 204, to either end of which is pivoted a link 205, which is in turn pivoted to an arm 206 sliding in guideways, the rear guideway 208 being attached to frame 100 and the front guideway 207 being attached to plate 160. (Shown in Figs. 5 and 6.) The upper dies are moved downwardly by means of an arm 210, one end of which is pivoted to a downwardly-extending cam-rod 211, forked at the lower end and spanning the shaft 50. The lower end of the rod 211 carries bowl 212, engaging a cam 213, carried by the shaft 50. The other end of the lever 210 is pivoted to a downwardly-extending spring-rod 214, having a spring 215, which engages a bracket 216 on the frame 100 and a collar 217 on the rod 214, as shown in Figs. 3 and 6, the cam 213 operating to move the embossing-dies 200 down to the blank and the spring 215 operating to return the same when the cam 213 has arrived at a position to allow the spring to act. The dies are shown as holding the blank in dotted lines in Fig. 34, which also shows the wiring mechanism about to commence to operate. It should, however, be understood that a separate mechanism of this sort for holding the blank is not essential, and that the movements of the carrier and the wiring mechanism may be so timed that the wiring mechanism itself will retain the blank in position while being wired.

The blank is carried from the gumming-mechanism C to the wiring mechanism by fingers 187, adjustably fixed to the carrier-arms $m$ $m'$, Fig. 4. These fingers engage the rear edge of the blank and move it to the wiring mechanism, and at the same time the blank which has just been wired is carried to the folding mechanism D by two fingers 188, pivoted in the carrier-arms and frictionally held in or out of position to engage with the blank by a flat spring 189. (Shown in Figs. 4$^a$ and 4$^b$.) The fingers 187 in carrying the blank to the wiring position move it against two pivoted adjustable stops 190, which fix its position accurately. When this occurs, the fingers 188 have moved the preceding blank to the folding mechanism, and on their return to get the blank which has just been wired the stops 190 will be thrown down, as shown in Fig. 3, by a shoulder 191, engaging studs 192 on the stops 190, the blanks being now held by the embossing-dies 200 201. The shoulder 191 is formed on the under side of the carriers m m', they being cut away, as shown at 193, so as to permit the stops 190 to rise, as above described. They are thrown up again by springs 194 (shown in Fig. 21) as the fingers 188 again move toward the folding mechanism and the shoulder 191 moves past the stud 192. The fingers 188 are thrown up to engage the blank by pins 195 in the carrier-guides 196, which engage the lower edge of the fingers 188 and are held in this raised position by the springs 189. These fingers are lowered again as they return to allow them to pass under the blank by two studs 197, as shown in Figs. 4 and 5, which are carried by one of the embossing-dies 200 previously described. As the fingers 188 move back from the folder D the embossing-dies will be down and holding the blank in position to be wired and also bringing the studs 197 into the path of the upper edge of the fingers 188 and throw them downward. The carriers are cut away at 198 for the purpose of giving clearance to the pins 195 during such movement of the carriers.

The wire is fed (see Fig. 2ª) to the guide 88 and feeding-disks 81 82 from the wire-reel Y and through a short guide 220 by two feeding-disks 221 222, the lower one, 222, being grooved to retain the wire in position as it is being fed. The wire is preferably fed by the disks 221 222 a little faster than it is taken up by disks 81 82 and so that a supply-loop will be formed which can be readily drawn from without danger of the wire being strained too tightly, and thereby being broken. This adjustment of the feed is secured by making the disks 221 222 a little larger than required to feed at the same rate as disks 81 82. I find it necessary to provide this slack wire from which to feed, for the further reason that if the wire is drawn into the machine under any tension a twisting and unevenness of the wire are produced.

The driving mechanism for the shafts 50 and 80 is as follows: The driving-shaft E (see Fig. 1) carries a gear 225, which meshes with an intermediate gear 226, mounted on a stud 227, which stud also carries a smaller gear 228, which in turn meshes with a gear 229, carried by a stud 230, fixed on the frame of the machine. The stud 230 also carries a bevel-gear 231, meshing with another bevel-gear 232, mounted on a short shaft 233. (See Fig. 2ª.) The short shaft 233 carries a gear 234, which meshes with a gear 235, carried by the shaft 50. The gear 235 in turn meshes with a gear 236, carried by shaft 80, the relative size of all the gears being such as to produce an accurate timing of the mechanism engaged in attaching the wire to the envelop-blank, one blank being wired for every revolution of the shaft E.

The driving of the feeding-disks 221 222 is as follows: The feeding-disks 221 222 are carried by short shafts 237 238, mounted in a bracket 239, fixed to the table B of the machine, the wire-reel Y being supported in a bracket 240, which is also fixed to the frame of the machine. The shafts of the feeding-disks 221, 222 carry intermeshing gears 241, the lower one of which meshes with a gear 242, carried by the shaft 233 through intermediates 243, mounted in the bracket 239, all of which is shown clearly in Fig. 2ª.

The operation of the machine is as follows: Sufficient wire is fed forward by the feeding-disks 82 and 90 to form an opener during one-third of each revolution of the shaft 80. While the wire is being fed, parts of the machine, which afterward coöperate in bending and inserting the opener, at this time form a guiding-channel by which the thin and flexible wire is guided. This feature is of importance, since such light wire as is required for this purpose demands support substantially on all sides and substantially throughout its length while being fed. As soon as the feeding is completed the cam 45 will permit the lower end of lever 42 to rise under the pull of spring 46, thus allowing the grippers 30 31 to close upon the wire and hold it fast between their gripping-faces and the pieces 32 33. At this time the clenchers 52 53 are in their lower position and press upon the upper side of the wire. The wire is also held in the groove 10 of the plate 112, into which it is pressed by the table 111. Immediately after the grippers have closed the cam 46 commences to lift the outer end of lever 124, and thereby to depress plate 60 and bending-legs 77 78, the first result of which is to cut the wire and then to bend each end down to the position shown in Figs. 35 and 36 from the position shown in Figs. 33 and 34, which latter figures show the parts as they stand relatively to each other immediately before the cutting and bending of the wire. During the bending operation the body of the wire is held by the gripping-fingers 30 31. The table 111 does not serve as a support in the bending operation, its spring not being strong enough to serve this purpose. Simultaneously with the commencement of the bending operation the table 110 is moved out of the way of the leg 77 by plate 65, also operated by lever 42. In the machine shown both ends of the wire length are bent to form legs. This machine, however, may be used for bending, inserting, and securing to the blank but one of the ends. This may obviously be done in different ways by slight changes in the machine, as shown; but one of the simplest ways is to shorten the lower end of bending-leg 78, so that it will bend this end of the wire as it moves down. All parts of the machine will then move exactly as illustrated and as described herein, but of course will not act to bend, insert, or secure the wire except at the end acted on by leg 77. Immediately after the wire has been bent the cam 41 causes the outer end of lever 138 to rise, thereby causing plate 70 to descend, and with it plate 112, carrying the wire downward and pushing before it downward and outward the table 111 by reason of the contact of the grippers with the plates 113. The legs of the staple as they descend are supported in the grooves 17 18 of the legs 77 78 and also by the plates 113, which lie against the inner faces of the legs 77 78. Just before the moment at which the bent portions of the wire are forced through the blank path cam 172 raises the end of the lever 169, and thereby depresses plate 147, causing the pivoted lever 177 to come into contact with the lug 181 and push back the extension 180 of plate 176, rocking this plate and forcing forward the guide-blocks 11 and 12 into their forward position, being the position in which they are shown in Figs. 37 and 38. The bent-down portions of the wire now enter the openings 6 (see Fig. 20) and the guide-pieces 11 and 12 and descend until the body of the wire, resting in the groove 10, reaches the blank. At this moment the bending-blocks 154 and 155, moving upward under the action of cam 164 and rod 162, strike against the projecting ends of the wire and bend them over the flanges 2 of the guide-blocks to the position shown in Figs. 37 and 38, the operative part of the bending-blocks being the pivoted members 25. As soon as the wire has been bent to the position shown in Fig. 37 the blocks 155 reach a position in which the pivoted members 25 are permitted by the cutting away of the guide-pieces at 14 to swing downward under the pressure of springs 27. There is therefore no further bending of the wire performed by this pivoted member. The other and fixed members 24 of the benders 155 now come into operation and bend the staple up to the position shown in Figs. 39 and 40, at which point it is just ready to penetrate the blank for the second time. As the portion $y^2$ of the wire comes to this position it is deflected from the vertical by the pressure of the spring or guide-piece 3, Fig. 40, so that it may pass freely by the body portion $y$ of the wire length after penetrating the blank. At this point the cut-away portion 64 of the cam 127 comes into operation to permit plate 60 to rise temporarily, thereby lifting through the bracket 63 and stud 62 the clenchers 52 53 to the position shown in Figs. 41 and 42, so as to give clearance for the ends $y^2$ of the wire as they rise through the blank. The portions $y^2$ of the wire are forced up through the blank by drivers 148 149, rising under the influence of cam 164 and the connecting parts until they reach the position shown in Figs. 41 and 42. As soon as the bowl 126 of lever 124 passes the cut-away portion 64 of the cam 127 the plate 60 again descends, and with it the clenchers 52 and 53, clenching the ends $y^2$ of the wire, the parts taking the position shown in Figs. 43 and 44.

The operation of the mechanism by which the wire is attached to the blank being understood, the operation of the entire machine will be readily seen. The blanks having been picked up from the pile X by the pasting-fingers $c\ c'$ are stripped off from the pasting-fingers by the plate $p$ and the stripping-fingers $q$ and fall upon the guide-rods $m\ m'$ immediately in front of the driving-fingers 187. The carrier then is pushed forward through the operation of link $t$ and rod $t'$ and cam $v$ until the forward edge of the blanks is brought against the stops 190, which are then in their elevated position, the rods $m$ being cut away at 193, so as to permit the lugs 192 to enter the same. At the same time that a blank is being carried from the gumming mechanism to the wiring mechanism a blank is also being carried by the driving-fingers 188 from the wiring mechanism to the folding mechanism, these driving-fingers being thrown up into the position shown in Fig. 3 by the pins 195, which ride in the grooves 198 of the rods $m'$. These blanks having been carried to these positions, as just described, the carrier next returns under the control of the cam $v$ to transfer the next pair of blanks. In the travel of the carrier backward the fingers 188 are depressed by contact with the lugs 197, attached to the stamping-dies, which in that position of the press are in their depressed position, while at the time when the fingers 188 are moving forward and under the stamping-dies the latter are in their raised position and the lugs 197 are out of the path of the fingers 188. Being thus depressed, the fingers 188 pass under the blank which has just been wired and which during this wiring has been held by the standing dies and retreat until they have cleared the blank which has just been wired and are thrown up into operative position by the pins 195. At the same time the driving-fingers 187 have retreated to the position which they occupy when receiving blanks from the pasting apparatus.

In the modified construction shown in Figs. 45 to 47 the clenching of the wire is effected by means of a pivoted block 250, pivoted in the plate 112. The block 250 is preferably so placed that the end of the wire $y^2$ as it passes through the blank impinges against its face, as shown in Fig. 46. When the plate 55 is caused to descend in the manner before described, it causes, through the agency of the bell-crank 251, the block 250 to swing against the wire end $y^2$ and clench it. When it is in its depressed position, as shown in Fig. 45, the block 250 forms a portion of the guiding-channel for the wire in the same manner as do clenchers 52 53 in the constructions before described.

In the modified constructions shown in Figs. 48 to 50 the clencher 252 is pivoted to plate 55 by a stud passing through a slot at its upper end and is provided with a lug 253, which engages with a lug 254 upon the plate 55. The clencher is normally drawn by a spring 256. When the clencher is depressed, it forms a portion of the wire-guideway, being then in the position shown in Fig. 48. When the plate 55 rises in the manner heretofore described to permit the end $y^2$ of the wire to pass through the blank, the clencher 252 takes the position shown in Fig. 49 under the pull of the spring 256. When the plate 55 descends as above described, the clencher is caused by the lug 254 to take the position shown in Fig. 50, and the further descent of the plate 55 clenches the end of the wire.

The pivoted form of the clencher is, in my opinion, preferable in that it affords less possibility for the buckling of the end of the wire while being clenched.

In the modification shown in Figs. 51 to 55 the groove in the plate 112 for the reception of the wire length is placed slightly out of line with the other parts of the groove, and the openings between plate 32 and clencher 30 and plate 33 and clencher 31 are made diagonal, so as to connect the groove in the plate 112 with the other portions of the guideway. This offset is for the purpose of permitting the ends of the wire when inserted through the blank a second time to pass up alongside of the body of the wire without the use of special means for giving it such a course. I prefer to use this construction rather than to employ the spring-guide 3.

In the modified construction shown in Figs. 56 to 61 the clenchers 52 are set at an angle with the wire opener, so that as they descend the ends $y^2$ of the wire are forced by the sides of the recess, in which the clenchers move across the body of the wire into the locked position shown in Figs. 58 and 61. This diagonal position of the clenchers may be also applied, if desired, to the modified constructions shown in Figs. 45 to 50 in an obvious manner.

Figure 62:
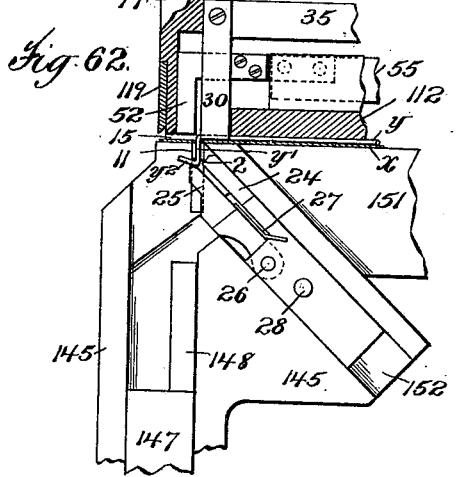
Figure 63:
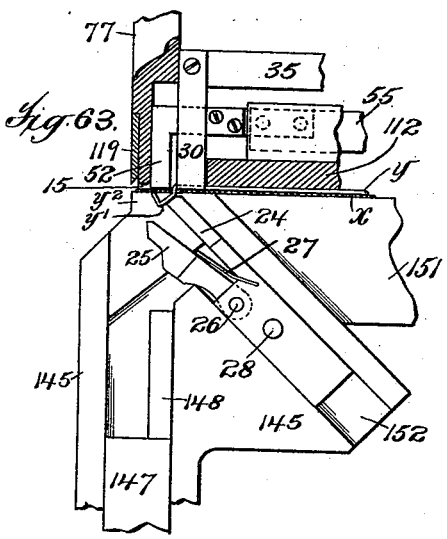
Figure 64:
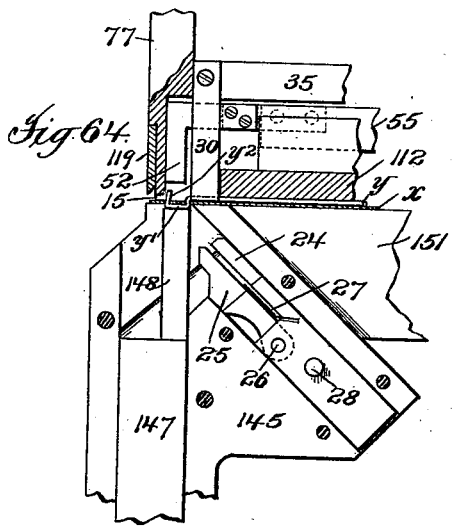
Figure 65:
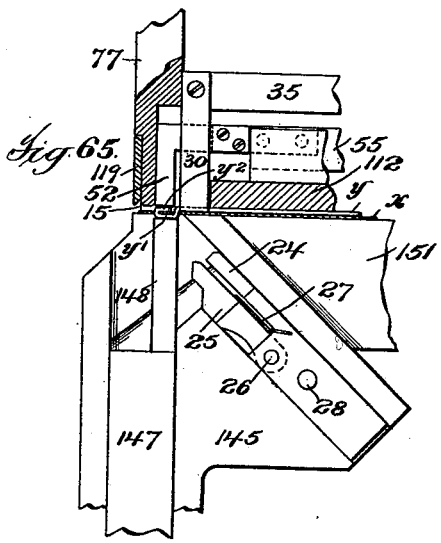

In the modified construction shown in Figs. 62 to 65 the benders 24 and 25 which move diagonally to give the second bend to the wire are so placed as to move outwardly instead of inwardly, and thus to give the wire an outward instead of an inward bend. With this exception the construction and operation of the parts are the same as that before described. In Fig. 62 the parts are shown in the position they occupy just after the benders 25 have bent up the end $y^2$ of the wire about the anvil-guide 11. Fig. 63 shows the parts in the position they occupy when the end $y^2$ of the wire is about to be forced through the blank, Fig. 64 shows the parts in the position they occupy just after the end $y^2$ of the wire has been forced through the blank, and Fig. 65 shows the parts in their position just after the wire has been clenched.

Under the term "blank" as used in this specification I intend to include any sheet of suitable material from which a package may be formed in whole or in part or which may be applied to a package whether or not the same has been cut or trimmed to its final form at the time when the opener is applied. Thus it would be within my invention to apply the openers to a continuous strip or web of suitable material and after the attachment of the openers to cut or trim the blanks from the strip or web, and I intend to include under the term "blank" the portion of the strip or web in such case to which the opener is attached and which is afterward detached from the remainder of the strip or web to form the finished blank before its manipulation to form or its application to a receptacle.

Under the term "wire opener" as used herein I intend to include any device of wire which may be attached to a part of a receptacle and used to open that receptacle by severing the material of which the receptacle is composed.

It will be observed that in the operation of the mechanism above described the opener is placed on the inside of the blank—that is, so placed that when the blank is formed into or applied to a receptacle the body of the opener will lie within the receptacle. It will further be observed that the attachment of the opener to the blank is secure—that is, that it is sufficient to resist the pull upon the wire when the latter is used to open the package. It is necessary that the opener should be thus attached securely to the blank, as otherwise it would be pulled from the blank in the attempt to perform the opening operation without opening the package. It will therefore be observed that the opener when attached to the blank extends along the inside thereof on the intended opening-line, with a portion thereof securely attached to the blank.

What I claim is—

1. The combination of means for presenting to a blank a piece of wire of such length and gage as may be suitable to form an opener for the package in the making of which the blank is to be used, with means for mechanically attaching the wire length to the blank in such manner that the body portion of the wire length when applied to the blank shall lie along the inside thereof on the intended opening-line and that the blank may be cut upon the opening-line by pulling upon the wire, substantially as described.

2. The combination of means for presenting to a paper blank a piece of wire of such length and gage as may be suitable to form an opener for the package in the making of which the blank is to be used, with means for mechanically attaching both ends of the wire length to the blank in such manner that the body portion of the wire length when applied to the blank shall lie along the inside thereof on the intended opening-line and that the wire shall be held to the blank against the pull required to use the wire to open the package, substantially as described.

3. The combination of means for presenting to a blank a piece of wire of such length and gage as may be suitable to form an opener for the package in the making of which the blank is to be used, means for bending an end of the wire length, means for inserting the bent end into the blank with the body portion of the wire extending along the inside thereof on the intended opening-line, and means for securing the last-mentioned end to the blank in such manner as to hold the wire against the pull required to use the wire to open the package, substantially as described.

4. The combination of means for presenting to a blank a piece of wire of such length and gage as may be suitable to form an opener for the package in the making of which the blank is to be used, means for bending the ends of the wire length, means for inserting the bent ends into the blank with the body portion of the wire length extending along the inside thereof on the intended opening-line, and means for securing one at least of the last-mentioned ends to the blank in such manner as to hold the wire against the pull required to use the wire to open the package, substantially as described.

5. The combination of means for presenting to a blank a piece of wire of such length and gage as may be suitable to form an opener for the package in the making of which the blank is to be used, means for bending the ends of the wire length, means for inserting the bent ends into the blank with the body portion of the wire length extending along the inside thereof on the intended opening-line, and means for securing the ends to the blank in such manner as to hold the wire against the pull required to use the wire to open the package, substantially as described.

6. The combination of means for feeding a series of blanks, means for presenting to each of said blanks a piece of wire of such length and gage as may be suitable to form an opener for the package in the making of which the blank is to be used, and means for mechanically attaching each wire length to each blank respectively in such manner that the body portion of the wire length when applied to the blank shall lie along the inside thereof on the intended opening-line and that the blank may be cut upon the opening-line by pulling upon the wire, substantially as described.

7. The combination of means for feeding a series of blanks, means for presenting to each of said blanks a piece of wire of such length and gage as may be suitable to form an opener for the package in the making of which the blank is to be used, and means for mechanically attaching both ends of each wire length to each blank respectively in such manner that the body portion of the wire length when applied to the blank shall lie along the inside thereof on the intended opening-line and that the wire shall be held to the blank against the pull required to use the wire to open the package, substantially as described.

8. The combination of means for feeding a series of blanks, means for presenting to each of said blanks a piece of wire of such length and gage as may be suitable to form an opener for the package in the making of which the blank is to be used, means for bending an end of each wire length, means for inserting the bent end into the blank with the body portion of the wire length extending along the inside thereof on the intended opening-line, and means for securing the last-mentioned end to the blank in such manner as to hold the wire against the pull required to use the wire to open the package, substantially as described.

9. The combination of means for feeding a series of blanks, means for presenting to each of said blanks a piece of wire of such length and gage as may be suitable to form an opener for the package in the making of which the blank is to be used, means for bending the ends of each wire length, means for inserting the bent ends into the blank with the body portion of the wire length extending along the inside thereof on the intended opening-line, and means for securing one at least of the last-mentioned ends to the blank in such manner as to hold the wire against the pull required to use the wire to open the package, substantially as described.

10. The combination of means for feeding a series of blanks, means for presenting to each of said blanks a piece of wire of such length and gage as may be suitable to form an opener for the package in the making of which the blank is to be used, means for bending the ends of each wire length, means for inserting the bent ends into the blank with the body portion of the wire length extending along the inside thereof on the intended opening-line, and means for securing the ends to the blank in such manner as to hold the wire against the pull required to use the wire to open the package, substantially as described.

11. In a machine for providing blanks with wire openers, the combination of means for feeding a strand of wire, means for cutting therefrom a suitable length to form an opener for the package in the making of which the blank is to be used, and means for mechanically attaching the wire length to the blank in such manner that the body portion of the wire length when applied to the blank shall lie along the inside thereof on the intended opening-line and that the blank may be cut upon the opening-line by pulling upon the wire, substantially as described.

12. In a machine for providing blanks with wire openers, the combination of means for feeding a strand of wire, means for cutting therefrom a suitable length to form an opener for the package in the making of which the blank is to be used, and means for mechanically attaching the ends of the wire length to the blank in such manner that the body portion of the wire length when applied to the blank shall lie along the inside thereof on the intended opening-line and that the wire shall be held to the blank against the pull required to use the wire to open the package, substantially as described.

13. In a machine for providing blanks with wire openers, the combination of means for feeding a strand of wire, means for cutting therefrom a suitable length to form an opener for the package in the making of which the blank is to be used, means for bending an end of the wire length, means for inserting the bent end into the blank with the body portion of the wire length extending along the inside thereof on the intended opening-line, and means for securing the last-mentioned end to the blank in such manner as to hold the wire against the pull required to use the wire to open the package, substantially as described.

14. In a machine for providing blanks with wire openers, the combination of means for feeding a strand of wire, means for cutting therefrom a suitable length to form an opener for the package in the making of which the blank is to be used, means for bending the ends of the wire length, means for inserting the bent ends into the blank with the body portion of the wire length lying along the inside thereof on the intended opening-line, and means for securing one at least of the last-mentioned ends to the blank in such manner as to hold the wire against the pull required to use the wire to open the package, substantially as described.

15. In a machine for providing blanks with wire openers, the combination of means for feeding a strand of wire, means for cutting therefrom a suitable length to form an opener for the package in the making of which the blank is to be used, means for bending the ends of the wire length, means for inserting the bent ends into the blank with the body portion of the wire length lying along the inside thereof on the intended opening-line, and means for securing the last-mentioned ends to the blank in such a manner as to hold the wire against the pull required to use the wire to open the package, substantially as described.

16. The combination of means for feeding a series of blanks, means for feeding a strand of wire, means for cutting suitable lengths therefrom to form openers for the packages in the making of which the blanks are to be used, means for presenting the wire lengths to the blanks one of each to one of the other respectively as the blanks are fed forward, and means for mechanically attaching each wire length to each blank respectively in such manner that the body portion of the wire length when applied to the blank shall lie along the inside thereof on the intended opening-line and that the blank may be cut upon the opening-line by pulling upon the wire, substantially as described.

17. The combination of means for feeding a series of blanks, means for feeding a strand of wire, means for cutting suitable lengths therefrom to form openers for the packages in the making of which the blanks are to be used, means for presenting the wire lengths to the blanks one of each to one of the other respectively as the blanks are fed forward, and means for mechanically attaching both ends of each wire length to each blank respectively in such manner that the body portion of the wire length when applied to the blank shall lie along the inside thereof on the intended opening-line and that the wire shall be held to the blank against the pull required to use the wire to open the package, substantially as described.

18. The combination of means for feeding a series of blanks, means for feeding a strand of wire, means for cutting suitable lengths therefrom to form openers for the packages in the making of which the blanks are to be used, means for bending an end of each wire length, means for inserting the bent end into the blank with the body portion of the wire length extending along the inside thereof on the intended opening-line, and means for securing the last-mentioned end to the blank in such manner as to hold the wire against the pull required to use the wire to open the package, substantially as described.

19. The combination of means for feeding a series of blanks, means for feeding a strand of wire, means for cutting suitable lengths therefrom to form openers for the packages in the making of which the blanks are to be used, means for bending the ends of each wire length, means for inserting the bent ends into the blank with the body portion of the wire length extending along the inside thereof on the intended opening-line, and means for securing one at least of the last-mentioned ends to the blank in such manner as to hold the wire against the pull required to use the wire to open the package, substantially as described.

20. The combination of means for feeding a series of blanks, means for feeding a strand of wire, means for cutting suitable lengths therefrom to form openers for the packages in the making of which the blanks are to be used, means for bending the ends of each wire length, means for inserting the bent ends into the blank with the body portion of the wire length extending along the inside thereof on the intended opening-line, and means for securing the ends to the blank in such manner as to hold the wire against the pull required to use the wire to open the package, substantially as described.

21. The combination with mechanism for mechanically attaching a wire opener to a blank, of mechanism for folding said blank to form an envelop or other receptacle, and mechanism for advancing the blank from the first to the second of the mechanisms mentioned, substantially as described.

22. The combination of means for presenting to a blank a piece of wire of such length and gage as may be suitable to form an opener for the package in the making of which the blank is to be used, means for mechanically attaching the wire length to the blank in such manner that the body portion of the wire length when applied to the blank shall lie along the inside thereof on the intended opening-line and that the blank may be cut upon the opening-line by pulling upon the wire, mechanism for folding the blank to form an envelop or other receptacle, and means for advancing the blank from the wiring to the folding mechanism, substantially as described.

23. The combination of means for presenting to a blank a piece of wire of such length and gage as may be suitable to form an opener for the package in the making of which the blank is to be used, means for mechanically attaching both ends of the wire length to the blank in such manner that the body portion of the wire length when applied to the blank shall lie along the inside thereof on the intended opening-line and that the wire shall be held to the blank against the pull required to use the wire to open the package, mechanism for folding the blank to form an envelop or other receptacle, and means for advancing the blank from the wiring to the folding mechanism, substantially as described.

24. The combination of means for presenting to a blank a piece of wire of such length and gage as may be suitable to form an opener for the package in the making of which the blank is to be used, means for mechanically attaching the wire length to the blank in such manner that the body portion of the wire length when applied to the blank shall lie along the inside thereof on the intended opening-line and that the blank may be cut upon the opening-line by pulling upon the wire, mechanism for folding the blank about the wire so that the body of the wire shall lie inside the fold, and means for advancing the blank from the wiring to the folding mechanism, substantially as described.

25. The combination of means for applying adhesive material to a blank, means for mechanically attaching a wire opener to the same, and means for folding the wired blank to form an envelop or other receptacle, substantially as described.

26. The combination of mechanism for applying adhesive material to a blank, mechanism for mechanically attaching a wire opener to the same, mechanism for folding the wired blank to form an envelop or other receptacle, and means for advancing the blank from the first to the second and from the second to the third of the mechanisms mentioned, substantially as described.

27. The combination of means for applying adhesive material to a blank, means for advancing the blank to a wiring mechanism, means for presenting to the blank a piece of wire of such length and gage as may be suitable to form an opener for the package in the making of which the blank is to be used, means for mechanically attaching the wire length to the blank in such manner that the body portion of the wire length when applied to the blank shall lie along the inside thereof on the intended opening-line and that the blank may be cut upon the opening-line by pulling upon the wire, and mechanism for folding the blank to form an envelop or other receptacle, substantially as described.

28. The combination of means for applying adhesive material to a blank, means for advancing the blank to a wiring mechanism, means for presenting to the blank a piece of wire of such length and gage as may be suitable to form an opener for the package in the making of which the blank is to be used, means for mechanically attaching the wire length to the blank in such manner that the body portion of the wire length when applied to the blank shall lie along the inside thereof on the intended opening-line and that the blank may be cut upon the opening-line by pulling upon the wire, mechanism for folding the blank to form an envelop or other receptacle, and means for advancing the blank from the wiring to the folding mechanism, substantially as described.

29. The combination of means for applying adhesive material to a blank, means for advancing the blank to a wiring mechanism, means for presenting to the blank a piece of wire of such length and gage as may be suitable to form an opener for the package in the making of which the blank is to be used, means for mechanically attaching the wire length to the blank in such manner that the body portion of the wire length when applied to the blank shall lie along the inside thereof on the intended opening-line and that the blank may be cut upon the opening-line by pulling upon the wire, and means for folding the blank about the wire length so that the body of the wire length shall lie within the fold, substantially as described.

30. The combination of means for presenting to material to be wired a piece of wire having an end thereof bent to form a leg and for forcing the leg through the material, with means for forcing the leg through the material a second time and in the reverse direction, substantially as described.

31. The combination of means for presenting to material to be wired a piece of wire having an end thereof bent to form a leg and for forcing the leg through the material, with means for bending the leg which has been forced through the material, and means for forcing it through the material a second time and in the reverse direction, substantially as described.

32. The combination of means for presenting to material to be wired a piece of wire having an end thereof bent to form a leg and for forcing the leg through the material with means for forcing the leg through the material a second time and in the reverse direction, and means for clenching the leg, substantially as described.

33. The combination of means for presenting to material to be wired a piece of wire having an end thereof bent to form a leg and for forcing the leg through the material with means for bending the leg which has been forced through the material and means for forcing it through the material a second time and in the reverse direction, and means for clenching the leg, substantially as described.

34. The combination of means for presenting to material to be wired a piece of wire having the ends thereof bent to form two legs and for forcing the legs through the material, with means for forcing the legs through the material a second time and in the reverse direction, substantially as described.

35. The combination of means for presenting to material to be wired a piece of wire having the ends thereof bent to form two legs and for forcing the legs through the material, with means for bending the legs after they have been forced through the material, and means for forcing them through the material a second time and in the reverse direction, substantially as described.

36. The combination of means for presenting to material to be wired a piece of wire having the ends thereof bent to form two legs and for forcing the legs through the material with means for forcing the legs through the material a second time and in the reverse direction, and means for clenching the legs, substantially as described.

37. The combination of means for presenting to material to be wired a piece of wire having the ends thereof bent to form two legs and for forcing the legs through the material, with means for bending the legs after they have been forced through the material, means for forcing the legs a second time through the material in the reverse direction, and means for clenching the legs, substantially as described.

38. The combination of means for feeding wire, means for cutting a wire length, means for bending an end thereof to form a leg and for forcing the leg through the material to be wired, and means for forcing the leg through the material a second time and in the reverse direction, substantially as described.

39. The combination of means for feeding wire, means for cutting a wire length, means for bending an end thereof to form a leg and for forcing the leg through the material to be wired, means for bending the leg which has been forced through the material, and means for forcing it through the material a second time and in the reverse direction, substantially as described.

40. The combination of means for feeding wire, means for cutting a wire length, means for bending an end thereof to form a leg and for forcing the leg through the material, means for forcing the leg through the material a second time and in the reverse direction, and means for clenching the leg, substantially as described.

41. The combination of means for feeding wire, means for cutting a wire length, means for bending the ends thereof to form two legs and for forcing the legs through the material, and means for forcing the legs through the material a second time and in the reverse direction, substantially as described.

42. The combination of means for feeding wire, means for cutting a wire length, means for bending the ends thereof to form two legs and for forcing the legs through the material, means for bending the legs after they have been forced through the material, and means for forcing the legs through the material a second time and in the reverse direction, substantially as described.

43. The combination of means for feeding wire, means for cutting a wire length, means for bending the ends thereof to form two legs and for forcing the legs through the material, means for forcing the legs through the material a second time and in the reverse direction, and means for clenching the legs, substantially as described.

44. The combination of means for feeding wire, means for cutting a wire length, means for bending the ends thereof to form two legs and for forcing the legs through the material, means for bending the legs after they have been forced through the material, means for forcing the legs through the material a second time and in the reverse direction, and means for clenching the legs, substantially as described.

45. A machine for shaping articles of wire in which various parts coöperate to form a guiding-channel supporting the wire substantially on all sides as it is fed, which parts after the feeding of the wire move with reference to each other to give the wire the desired shape, substantially as described.

46. A machine for forming an instrument of wire and attaching it to the material in connection with which it is to be used in which various parts coöperate to form a guiding-channel supporting the wire on all sides as it is fed, which parts after the feeding of the wire move with reference to each other to bend the wire into the desired shape and insert it into the material to be wired, substantially as described.

47. A machine for forming and attaching a wire opener in which various parts coöperate to form a guiding-channel supporting the wire on all sides as it is fed, which parts after the feeding of the wire move with reference to each other to bend the wire and insert it into the blank, substantially as described.

48. The combination of means for feeding wire forward, means for cutting a length, a gripper for holding the wire length while being bent, a bender for bending the end of the wire past the gripper, a pivoted support for the wire while being fed in line with the bender, and means for swinging the support out of the way when the bender operates, substantially as described.

49. In a wire-bending machine, the combination of an anvil, means for bending a wire over the anvil, means for bending the wire across the space occupied by the anvil, and means for withdrawing the anvil to permit the last-mentioned bending means to operate, substantially as described.

50. The combination of an anvil, a reciprocating bender made in two parts movable with relation to each other, means for moving the bender to bend the wire upon the anvil, means for withdrawing the anvil, means for causing one portion of the bender to move out of operative position, and means for further advancing the bender to bend the wire past the position occupied by the anvil, substantially as described.

51. In a wire-bending machine, the combination of a wire-guide piece adapted to direct the course of the wire as it is fed, with means for advancing the guide-piece to serve as a guide for the wire, means for bending the wire over the guide-piece, and means for withdrawing the guide-piece so that the bent wire may be driven, substantially as described.

52. In a wire-bending machine, the combination of side plates for supporting the wire while being bent, an anvil, means for advancing and withdrawing the same, a reciprocating bender moving between the side plates, and means for modifying the action of the bender upon the wire by withdrawing a portion thereof at the proper time, substantially as described.

53. In a wire-bending machine, mechanism for bending a wire in two directions and supporting it while being bent consisting of the combination of side plates for supporting the wire, an advancing-and-retreating anvil, a reciprocating bender moving between the side plates, and means for moving a portion of the bender from its operative position, substantially as described.

54. In a wire-bending machine, the combination of guiding-plates to support the wire on opposite sides while being bent with a reciprocating bender moving between the plates and operating upon the wire, substantially as described.

55. In a wire bending and inserting machine, the combination of two side plates for supporting the wire on opposite sides while being bent and inserted, with a plunger moving between the side plates for bending the wire, and a second plunger moving between the plates for forcing the wire into the material to be wired, substantially as described.

56. In a machine for forming and inserting a wire instrument, the combination of means for forming and inserting the wire with a clencher therefor which in its normal position coöperates with other parts of the machine to form a guiding-channel for the wire while the latter is being fed, and which retreats to permit the end of the wire to pass through the material, and returns to its normal position to clench said end upon the material, substantially as described.

57. In a machine for forming and inserting a wire instrument, the combination of means for bending and inserting the wire, with a clencher therefor which retreats in order to permit the end of the wire to pass through the material, and advances to clench the wire upon the material, substantially as described.

58. In a machine for forming and inserting a wire instrument, the combination with means for feeding, bending and inserting the wire, of a pivoted clencher therefor forming a part of the guiding-channel for the wire as it is fed to the bending means and which swings backward in order to permit the end of the wire to pass through the material and swings forward to bend the wire toward the material, substantially as described.

59. A machine for forming an instrument of wire and attaching it to the material in connection with which it is to be used in which the groove which holds the body of the wire instrument while the same is being formed and set is slightly out of line with the grooves which receive the other portions of the wire, so as to permit the ends of the wire when bent inward to pass freely by the body portion of the wire, substantially as described.

60. The combination of mechanism for attaching a wire opener to a blank, mechanism for folding the blank, a reciprocating carrier for transferring the blank from the first to the second of the mechanisms mentioned, and means for holding the blank while being wired and preventing it from being carried backward by the carrier in its retreat, substantially as described.

61. The combination of mechanism for attaching a wire opener to a blank with mechanism for embossing the blank, the embossing mechanism serving to hold the blank while being wired, substantially as described.

62. The combination of mechanism for attaching a wire opener to a blank, mechanism for folding the blank, means for transferring the blank from the first to the second of the mechanisms mentioned, and embossing mechanism serving to emboss the blank and also to hold it while being wired, substantially as described.

63. In a machine for shaping wire, the combination with means for bending a wire upon itself so that the end may pass the body, of means for deflecting the end as it is bent to prevent it from striking the body, substantially as described.

64. The combination with means for bending a wire, of a guide 3 for directing the end of the wire as it is bent past the body thereof, substantially as described.

65. The combination with means for presenting to material to be wired a piece of wire having an end thereof bent to form a leg and for forcing the leg through the material, of means for forcing the leg through the material a second time and in the reverse direction, and means for clenching the leg and locking it across the body of the wire, substantially as described.

66. The combination with means for presenting to material to be wired a piece of wire having the ends thereof bent to form two legs and for forcing the legs through the material, of means for forcing the legs through the material a second time and in the reverse direction, and means for clenching the legs and locking them across the body of the wire, substantially as described.

67. The combination of means for feeding wire, means for cutting a wire length, means for bending an end thereof to form a leg and for forcing the leg through the material, means for forcing the leg through the material a second time and in the reverse direction, and means for clenching the leg and locking it across the body of the wire, substantially as described.

68. The combination of means for feeding wire, means for cutting a wire length, means for bending the ends thereof to form two legs and for forcing the legs through the material, means for forcing the legs through the material a second time and in the reverse direction, and means for clenching the legs and locking them across the body of the wire, substantially as described.

69. In a wire-bending machine, the combination of a gripper which grasps the wire on the sides thereof, and a bender which bends the end of the wire past the gripper, the wire being thus bent without a supporting-anvil, substantially as described.

70. In a wire-bending machine, the combination of two grippers which grasp the ends of the wire length respectively on the sides thereof, and two benders which bend the ends of the wire past the grippers, the wire being thus bent without a supporting-anvil, substantially as described.

In testimony whereof I have hereunto set my hand in the presence of two subscribing witnesses.

EDWARD P. SHELDON.

Witnesses:
G. M. BORST,
T. F. KEHOE.